US010135291B2

United States Patent
Kim et al.

(10) Patent No.: US 10,135,291 B2
(45) Date of Patent: Nov. 20, 2018

(54) METHOD FOR CHARGING ONE OR MORE ELECTRONIC DEVICES AND CHARGING DEVICE THEREFOR

(71) Applicant: Samsung Electronics Co., Ltd., Gyeonggi-do (KR)

(72) Inventors: Dong-Zo Kim, Gyeonggi-do (KR); Keum-Su Song, Seoul (KR); Sung-Bum Park, Gyeonggi-do (KR); Do-Won Kim, Gyeonggi-do (KR); Sung-Ku Yeo, Daejeon (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/707,448

(22) Filed: Sep. 18, 2017

(65) Prior Publication Data

US 2018/0006487 A1    Jan. 4, 2018

Related U.S. Application Data

(63) Continuation of application No. 14/835,288, filed on Aug. 25, 2015, now Pat. No. 9,768,638.

(30) Foreign Application Priority Data

Sep. 25, 2014    (KR) .................. 10-2014-0128114

(51) Int. Cl.
*H02J 7/02*     (2016.01)
*H02J 50/12*    (2016.01)
(Continued)

(52) U.S. Cl.
CPC ............ *H02J 7/025* (2013.01); *H02J 7/0021* (2013.01); *H02J 7/0044* (2013.01); *H02J 7/027* (2013.01);
(Continued)

(58) Field of Classification Search
CPC .. H02J 7/025; H02J 7/041; H02J 7/027; H02J 50/80; H02J 7/0021; H02J 50/12; H02J 7/0044
(Continued)

(56) References Cited

U.S. PATENT DOCUMENTS

| 8,760,113 B2 | 6/2014 | Keating et al. |
| 9,160,182 B2 | 10/2015 | Keating et al. |

(Continued)

FOREIGN PATENT DOCUMENTS

| KR | 1020110137393 | 12/2011 |
| KR | 1020140062211 | 5/2014 |
| WO | WO 2010/093729 | 8/2010 |

OTHER PUBLICATIONS

International Search Report dated Jan. 13, 2016 issued in counterpart application No. PCT/KR2015/010039, 12 pages.

*Primary Examiner* — Sun Lin
(74) *Attorney, Agent, or Firm* — The Farrell Law Firm, P.C.

(57) ABSTRACT

A charging device for charging one or more electronic devices is provided. The charging device includes a charging unit configured to include a first charging unit, and a second charging unit, the second charging unit protruding upward from a surface of the charging unit at an angle greater than or equal to a predetermined reference angle with respect to the surface of the charging unit, wherein, if at least one of the first charging unit and the second charging unit is arranged to face at least one electronic device in a face-to-face manner, the at least one of the first charging unit and the second charging unit supplies a wireless power to the at least one electronic device.

16 Claims, 21 Drawing Sheets

(51) Int. Cl.
*H02J 7/00* (2006.01)
*H02J 7/04* (2006.01)
*H02J 50/80* (2016.01)

(52) U.S. Cl.
CPC .............. *H02J 7/041* (2013.01); *H02J 50/12* (2016.02); *H02J 50/80* (2016.02)

(58) Field of Classification Search
USPC ......................................................... 320/108
See application file for complete search history.

(56) References Cited

U.S. PATENT DOCUMENTS

| | | |
|---|---|---|
| 2009/0045773 A1 | 2/2009 | Pandya et al. |
| 2009/0102416 A1 | 4/2009 | Burley |
| 2010/0259217 A1 | 10/2010 | Baarman et al. |
| 2012/0104995 A1 | 5/2012 | Woo et al. |
| 2013/0113296 A1 | 5/2013 | Ryu et al. |
| 2013/0141037 A1 | 6/2013 | Jenwatanavet et al. |
| 2013/0300355 A1 | 11/2013 | Jung |
| 2016/0013677 A1 | 1/2016 | Bell |
| 2016/0126779 A1* | 5/2016 | Park .................. H02J 50/80 320/108 |

\* cited by examiner

METHOD FOR CHARGING ONE OR MORE ELECTRONIC DEVICES AND CHARGING DEVICE THEREFOR

PRIORITY

This application is a Continuation Application of U.S. patent application Ser. No. 14/835,288, filed on Aug. 25, 2015, and claims priority under 35 U.S.C. § 119(a) to a Korean Patent Application filed in the Korean Intellectual Property Office on Sep. 25, 2014, and assigned Serial No. 10-2014-0128114, the content of each of which is incorporated herein by reference.

BACKGROUND

1. Field of the Invention

The present invention relates generally to a method for charging one or more electronic devices and a charging device thereof.

2. Description of the Related Art

Because of recent remarkable developments in the areas of information, communication, and semiconductor technologies, the dissemination and utilization of various mobile terminals has increased rapidly. In particular, recent mobile terminals have reached a point of mobile convergence where mobile terminals can now cover functionality that was traditionally performed by other types of terminals in addition to their own unique functionality. For example, a mobile communication terminal may have a variety of additional functions, such as a television (TV) viewing function (e.g., mobile broadcasting, such as Digital Multimedia Broadcasting (DMB) or Digital Video Broadcasting (DVB)), a music playback function (e.g., MPEG Audio Layer-3 (MP3)), a photo shooting function, and an Internet access function, in addition to general communication functions, such as a voice call function and a messaging function.

Many mobile terminals are capable of receiving power wirelessly through a charging device.

FIG. 1 illustrates a first and second electronic device, which are wirelessly charged by a charging device, according to the prior art.

Referring to FIG. 1, a first electronic device 120 and a second electronic device 130 are put on a charging device 110 that is implemented in the form of a charging pad. Since the charging device 110 is a wireless charging device, the charging device 110 charges the first 10 electronic device 120 and the second electronic device 130, simply by the user placing the first electronic device 120 and the second electronic device 130 on the charging device 110. If power is input through an input port 111 of the charging device 110, a current flows in a coil of the charging device 110. As resonant coupling occurs between the coil of the charging device 110 and coils of the first electronic device 120 and the second electronic device 130, and a 15 current of the charging device 110 is delivered by the resonant coupling to the first electronic device 120 and the second electronic device 130 that are placed on the charging device 110, the power of the charging device 110 may be delivered to the first electronic device 120 and the second electronic device 130.

FIGS. 2A and 2B illustrate how the electronic device 130 is wirelessly charged with 20 power by the charging device 110 according to the prior art. It will be assumed in FIGS. 2A and 2B that the electronic device 130 is a wearable device that is implemented in the form of a wristwatch.

Referring to FIG. 2A, an electronic device 130 is provided with power from the charging device 110, when the electronic device 130 is placed on the charging device 110. As 25 mentioned above, the power charging between the charging device 110 and the electronic device 130 may be performed by the resonant coupling between the charging device 110 and the electronic device 130. Since the electronic device 130 is implemented as a wristwatch-type wearable device, the electronic device 130 may be placed on the charging device 110 in a manner where the electronic device 130 rests on its side while on the charging device 110, as shown in FIG. 2A.

Referring to FIG. 2B, an angle between a receiving (Rx) resonator 135, including a coil of the electronic device 130, and a transmitting (Tx) resonator 115, including a coil of the charging device 110, is A°. The angle A° may be, for example, 90°.

Since the angle between the Tx resonator 115 and the Rx resonator 135 is A°, the angle between the coil included in the Tx resonator 115 and the coil included in the Rx resonator 135 is also A°. Charging efficiency is higher when the area in which the coils included in the resonators 115 and 135 are facing each other is wider. Since, in FIGS. 2A and 2B, the area in which the Tx resonator 115 and the Rx resonator 135 face each other is very narrow, the charging efficiency of the Tx resonator 115 and the Rx resonator 135 will be low. Due to the low charging efficiency, a lot of time is required to fully charge the electronic device 130, and the charging device 110 must supply a lot of power to the electronic device 130 in order to charge the electronic device 130. Accordingly, there is a need for a more efficient method of charging an electronic device.

SUMMARY

The present invention has been made to address at least the problems and/or disadvantages described above, and to provide at least the advantages described below.

Accordingly, an aspect of the present invention is to provide a method for efficiently charging a wristwatch-type or wristband-type electronic device, and a charging device thereof.

Accordingly, another aspect of the present invention is to provide a method for efficiently charging multiple electronic devices simultaneously.

In accordance with an aspect of the present invention, a charging device for charging one or more electronic devices is provided. The charging device includes a charging unit configured to include a first charging unit, and a second charging unit, the second charging unit protruding from charging unit at an angle greater than or equal to a predetermined reference angle, where, if at least one of the first charging unit and the second charging unit is arranged to face at least one electronic device in a face-to-face manner, the at least one of the first charging unit and the second charging unit supplies wireless power to the at least one electronic device.

In accordance with another aspect of the present invention, a method for receiving wireless power at an electronic device is provided. The method includes determining whether power supply from a charging device is started, and running a clock mode, if the power supply is started.

In accordance another aspect of the present invention, an electronic device for receiving wireless power is provided. The electronic device includes a processor configured to determine whether power supply from a charging device is started, and to run a clock mode if the power supply is started, and a display configured to display at least one of a date, a day, a current time and weather in the clock mode.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE PRESENT INVENTION

Figure 1:
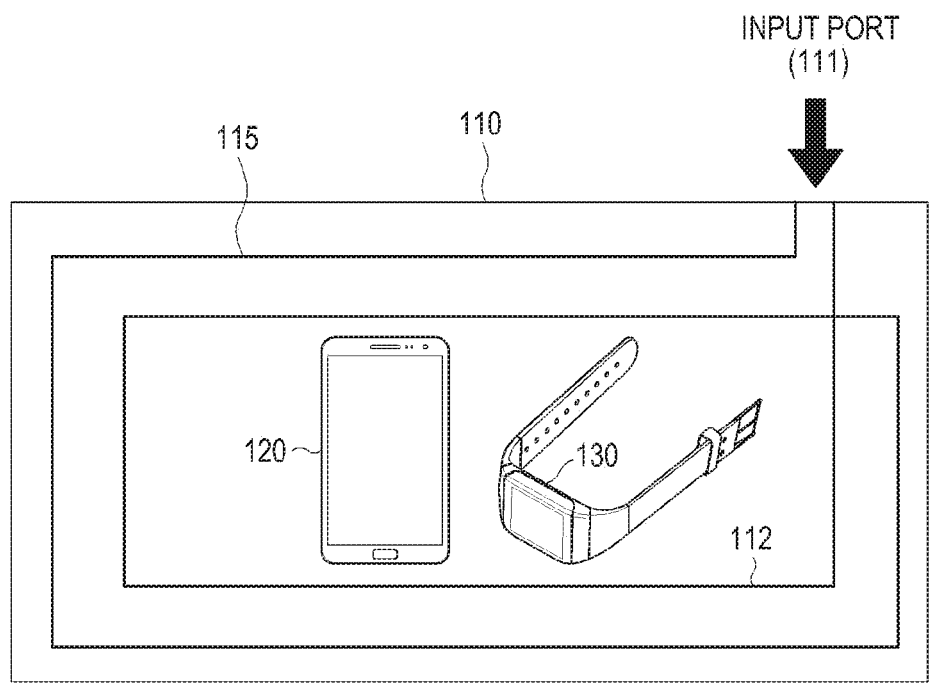
FIG. 1 illustrates a first and second electronic device, which are wirelessly charged by a charging device, according to the prior art.
Figure 2A:
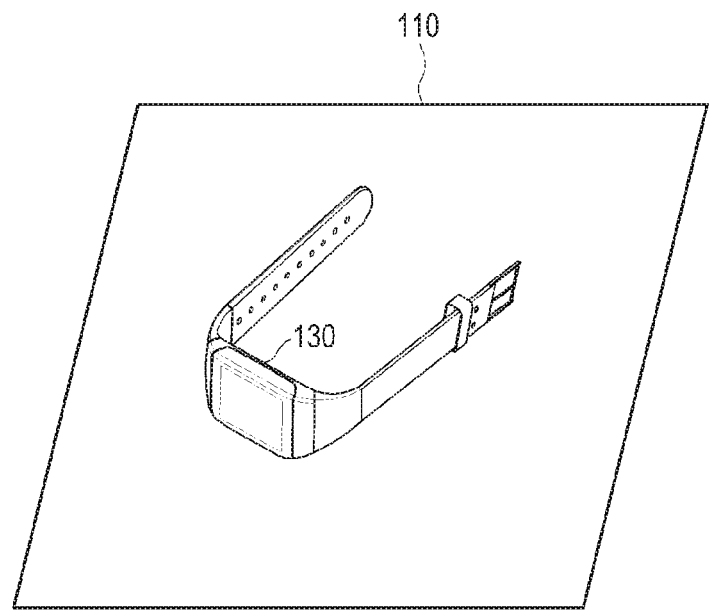
FIGS. 2A and 2B illustrate a method of wirelessly charging an electronic device with power provided by a charging device, according to the prior art.
Figure 2B:
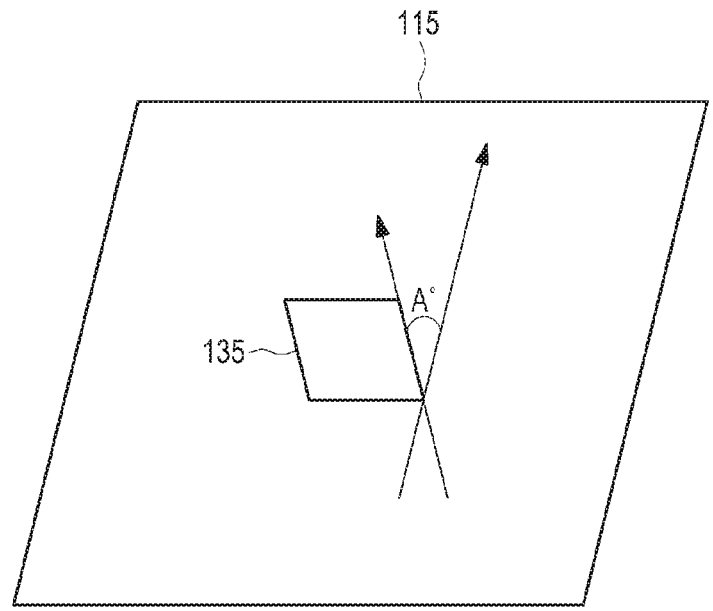

Hereinafter, embodiments of the present invention are described with reference to the accompanying drawings.

However, it should be appreciated that the present invention is not limited to the embodiments described herein, and all changes and/or equivalents or replacements thereto also belong to the scope of the present invention. The same or similar reference denotations may be used to refer to the same or similar elements throughout the specification and the drawings.

As used herein, the terms "have," "may have," "include," and "may include" indicate the existence of a feature (e.g., a number, function, operation, or a component such as a part) and do not exclude the existence of other features.

As used herein, the terms "A or B," "at least one of A and/or B," and "one or more of A and/or B" may include all possible combinations of A and B. For example, "A or B," "at least one of A and B," and "at least one of A or B" may indicate including A, including B, or including A and B.

As used herein, the terms "first" and "second" may modify various components regardless of importance and do not limit the components. These terms are only used to distinguish one component from another. For example, a first user device and a second user device may indicate different user devices from each other, regardless of the order or importance of the devices. For example, a first component may be referred to as a second component, and vice versa, without departing from the scope of the present invention.

It will be understood that when an element (e.g., a first element) is referred to as being (operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the first element and the second element.

As used herein, the terms "configured to" or "set to" may be interchangeably used with the terms "suitable for," "having the capacity to," "designed to," "adapted to," "made to," or "capable of" depending on circumstances. The terms "configured to" and "set to" do not essentially mean "specifically designed in hardware to." Rather, the terms mean that a device can perform an operation together with another device or parts. For example, the term "processor configured to perform A, B, and C" mean a generic-purpose processor (e.g., a Central Processing Unit (CPU) or application processor) that may perform the listed operations by executing one or more software programs stored in a memory device or a dedicated processor (e.g., an embedded processor) for performing the operations.

The terms as used herein are provided merely to describe some embodiments of the present invention, but are not intended to limit the scope of other embodiments of the present invention. It is to be understood that the singular forms "a," "an," and "the" include plural references unless the context clearly dictates otherwise. All terms including technical and scientific terms used herein have the same meaning as commonly understood by one of ordinary skill in the art to which the embodiments of the present invention belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein. Examples of the electronic device, according to embodiments of the present invention, include a smart phone, a tablet Personal Computer (PC), a mobile phone, a video phone, an e-book reader, a desktop PC, a laptop computer, a netbook computer, a workstation, a server, a Personal Digital Assistant (PDA), a Portable Multimedia Player (PMP), an MP3 player, a mobile medical device, a camera, or a wearable device (e.g., smart glasses, a Head-Mounted Device (HIVID), electronic clothes, an electronic bracelet, an electronic necklace, an electronic appcessory, an electronic tattoo, a smart mirror, or a smart watch).

According to an embodiment of the present invention, the electronic device may be a smart home appliance. Examples of the smart home appliance include a television, a Digital Versatile Disk (DVD) player, an audio player, a refrigerator, an air conditioner, a cleaner, an oven, a microwave oven, a washer, an air cleaner, a set-top box, a home automation control panel, a security control panel, a TV box (e.g., Samsung HomeSync™, Apple TV™, or Google TV™), a gaming console (e.g., Xbox™, PlayStation™, etc.), an electronic dictionary, an electronic key, a camcorder, or an electronic picture frame.

According to an embodiment of the present invention, examples of the electronic device include various medical devices (e.g., diverse portable medical measuring devices (such as a blood sugar measuring device, a heartbeat measuring device, a blood pressure measuring device, or a body temperature measuring device), a Magnetic Resource Angiography (MRA) device, a Magnetic Resource Imaging (MM) device, a Computed Tomography (CT) device, an imaging device, or an ultrasonic device), a navigation device, a Global Positioning System (GPS) receiver, an Event Data Recorder (EDR), a Flight Data Recorder (FDR), an automotive infotainment device, a sailing electronic device (e.g., a sailing navigation device or a gyro compass), avionics, security devices, vehicular head units, industrial or home robots, Automatic Teller Machines (ATMs), Point Of Sales (POS) devices, or Internet of Things (IoT) devices (e.g., a bulb, various sensors, an electric or gas meter, a sprinkler, a fire alarm, a thermostat, a street light, a toaster, fitness equipment, a hot water tank, a heater, or a boiler).

According to various embodiments of the present invention, examples of the electronic device include part of furniture or a building/structure, an electronic board, an electronic signature receiving device, a projector, or various measurement devices (e.g., devices for measuring water, electricity, gas, or electromagnetic waves).

According to an embodiment of the present invention, the electronic device may be one or a combination of the above-listed devices.

According to an embodiment of the present invention, the electronic device may be a flexible electronic device.

The electronic device disclosed herein is not limited to the above-listed devices, and may include new electronic devices depending on the development of technology.

Hereinafter, electronic devices according to embodiments of the present invention are described with reference to the accompanying drawings. As used herein, the term "user" may denote a human or another device (e.g., an artificial intelligent electronic device) using the electronic device.

Figure 3:
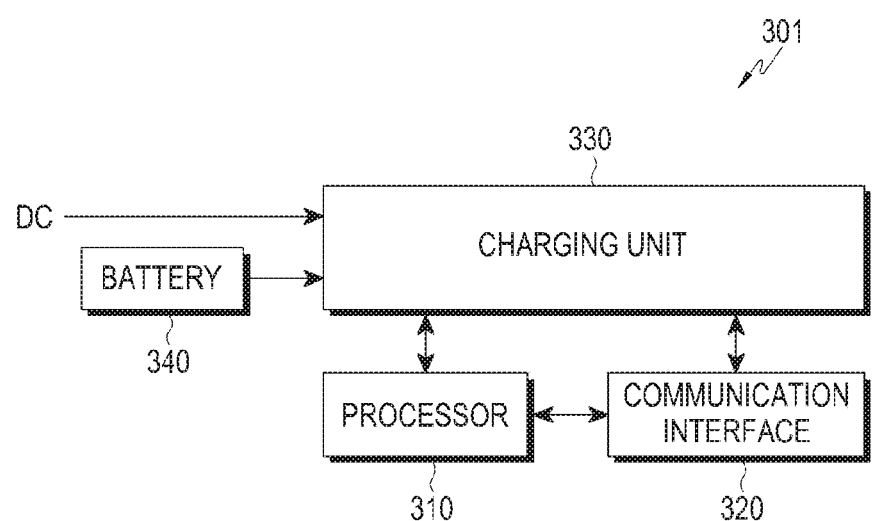
FIG. 3 is a block diagram of a charging device, according to an embodiment of the present invention.

FIG. 3 is a block diagram of a charging device, according to an embodiment of the present invention.

Referring to FIG. 3, the charging device 301 includes a processor 310, a communication interface 320, a charging unit 330, and a battery 340.

The processor 310 controls the overall operation of the charging device 301. For example, the processor 310 controls the overall operation of the charging device 301 using an algorithm, a program, or an application, which is read from a storage and is required for control. The processor 310 may be implemented in the form of a CPU, a microprocessor, or a minicomputer.

The processor 310 controls the charging device 301 to wirelessly supply power to one or more electronic devices. When transmitting wireless power to the one or more electronic devices, the processor 310 controls the charging device 301 to transmit the power supplied from the external power (DC) to the one or more electronic devices, or to transmit the power of the battery 340 to the one or more electronic devices.

The communication interface 320 performs the wired or wireless communication function of the charging device 301. The communication interface 320 receives a wireless power transmission request from one or more electronic devices. The communication interface 320 performs communication with the one or more electronic devices, using Near Field Communication (NFC), ZigBee communication, infrared communication, visible light communication, Bluetooth communication, Bluetooth Low Energy (BLE) communication, or the like. According to an embodiment of the present invention, the communication interface 320 may use a Carrier Sense Multiple Access with Collision Avoidance (CSMA/CA) algorithm. The above communication schemes are merely examples, the scope of the present invention is not limited to a particular communication scheme performed or used in the communication interface 320.

The charging unit 330 enables the charging device 301 to transmit wireless power to one or more electronic devices. The charging unit 330 may be implemented in the form of a Tx resonator that includes a coil structure in the form of being wound (or coiled) N times, and may further include a capacitor unit including, for example, a LUMP-type cap block.

If the charging device 301 transmits wireless power to one or more electronic devices, the charging unit 330 may transmit power in the form of an Alternating Current (AC) waveform, or may convert power from a Direct Current (DC) waveform to an AC waveform using an inverter to transmit the power in the form of an AC waveform. The charging unit 330 receives power supplied from the external power (DC) and transmits the power to one or more electronic devices, or receives power supplied from the battery 340 and transmits the power to one or more electronic devices. Alternatively, the charging unit 330 may be implemented in the form of a power receiving interface, to receive power from outside and supply the power to other components of the charging unit 330.

The charging unit 330 may supply power of an AC waveform to the one or more electronic devices, or may supply power of an AC waveform in the form of electromagnetic waves to the one or more electronic devices. If the charging unit 330 transmits power in the form of an AC waveform, an inductance L of a coil included in the charging unit 330 is changeable.

Although the charging unit 330 and the communication interface 320 are illustrated as separate components in FIG. 3, the charging unit 330 and the communication interface 320 may be implemented as one component according to another embodiment of the present invention.

Figure 4:
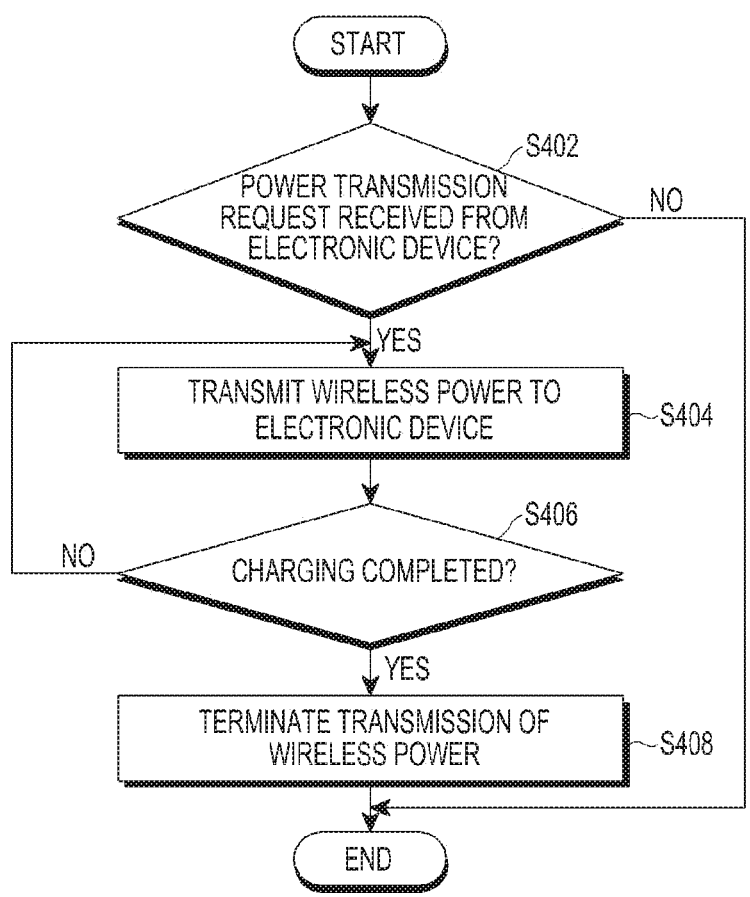
FIG. 4 is a flowchart illustrating a method for charging one or more electronic devices by a charging device, according to an embodiment of the present invention.

FIG. 4 is a flowchart illustrating a method for charging one or more electronic devices by a charging device, according to an embodiment of the present invention.

Referring to FIG. 4, the processor 310 of the charging device 301 determines in step S402 whether the processor 310 has received a power transmission request from at least one electronic device.

If it is determined in step S402 that the processor 310 has received a power transmission request from at least one electronic device, the processor 310 controls the charging device 301 to transmit wireless power to the at least one electronic device in step S404.

If it is determined in step S402 that the processor 310 has not received a power transmission request from at least one electronic device, the processor 310 controls the charging device 301 to maintain the current status without performing any operation.

Thereafter, the processor 310 determines in step S406 whether the charging of the electronic device has completed. If it is determined in step S406 that the charging of the electronic device has completed, the processor 310 terminates the transmission of wireless power to the electronic device in operation S408. If it is determined in step S406 that the charging of the electronic device is not completed, the processor 310 controls the charging device 301 to transmit wireless power to the at least one electronic device in operation 5404.

According to another embodiment of the present invention, if an electronic device is located adjacent to the charging unit 330 that is implemented in the form of a pad having a wide area, the charging device 301 may automatically transmit wireless power to the electronic device. For example, if an electronic device implemented in the form of a smart phone is placed on the charging device 301, the charging device 301 transmits wireless power to the smart phone. If a Tx resonator included in the charging unit 330 of the charging device 301 is adjacent to an Rx resonator included in a battery of the electronic device, power of the charging device 301 is delivered from the Tx resonator to the Rx resonator. The wireless charging is performed as the power of the charging device 301 is delivered to the electronic device by resonant coupling between the Tx resonator and the Rx resonator.

Figure 5:
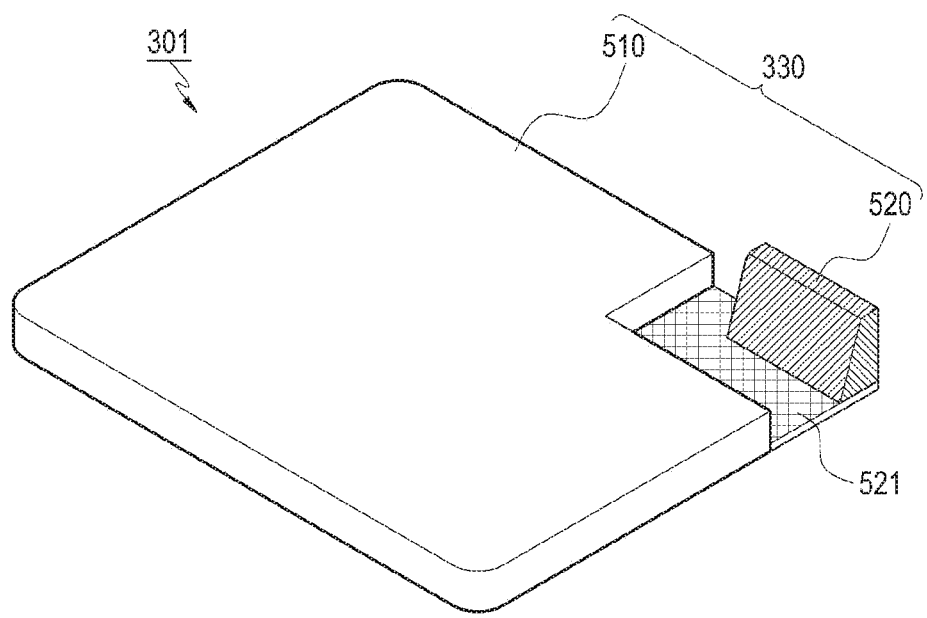
FIG. 5 is a schematic diagram of a charging device, according to an embodiment of the present invention.

FIG. 5 is a schematic diagram of a charging device, according to an embodiment of the present invention.

Referring to FIG. 5, the charging unit 330 of the charging device 301 includes a first charging unit 510 and a second charging unit 520. The charging device 301 is implemented in the form of a rectangular parallelepiped whose top and bottom areas are wide. The charging device 301 may, alternatively, be implemented in a variety of other shapes (e.g., square, circle, oval and the like), according to another embodiment of the present invention. A coil constituting a single loop is embedded in the charging unit 330. The coil may be embedded in the charging unit 330 in the form of being wound N times.

As illustrated in FIG. 5, the second charging unit 520 included in the charging unit 330 of the charging device 301 is implemented to be perpendicular to the first charging unit 510 in such a manner that the top right corner of the charging device 301 protrudes.

Alternatively, the second charging unit 520 may be located not only in the top right corner of the charging device 301, but also in any of the top left corner, the bottom left corner and the bottom right corner of the charging device 301. That is, the second charging unit 520 may be located anywhere on the charging device 301. Additionally, the second charging unit 520 may be designed to have a predetermined angle (e.g., 60° or more) with the first charging unit 510. The second charging unit 520 may be implemented to be foldable, so that when a user folds the second charging unit 520 it does not protrude and when the user unfolds the second charging unit 520 it protrudes.

The second charging unit 520 further includes a groove 521 into which an electronic device may be inserted. When the user inserts the electronic device into the groove 521, an Rx resonator of the electronic device and a Tx resonator included in the second charging unit 520 face each other. The second charging unit 520 has a relatively small area compared with the first charging unit 510. Accordingly, the user may mainly use the second charging unit 520 to charge a smaller electronic device (e.g., a small-screen electronic device such as a wearable device).

The first charging unit 510 includes all areas of the charging device 301 except for the area of the second charging unit 520 and the groove 521. As illustrated in FIG. 5, the first charging unit 510 is implemented to be parallel to a surface on which it rests, and has an area which is wider than the second charging unit 520. Accordingly, the user may mainly use the first charging unit 510 to charge an electronic device, such as a smart phone, whose screen size is large as compared with the wearable device.

In accordance with an aspect of the present invention, a charging device for charging one or more electronic devices is provided. The charging device includes a charging unit configured to include a first charging unit, and a second charging unit, the second charging unit protruding from charging unit at an angle greater than or equal to a predetermined reference angle, where, if at least one of the first charging unit and the second charging unit is arranged to face at least one electronic device in a face-to-face manner, the at least one of the first charging unit and the second charging unit supplies wireless power to the at least one electronic device.

Figure 6:
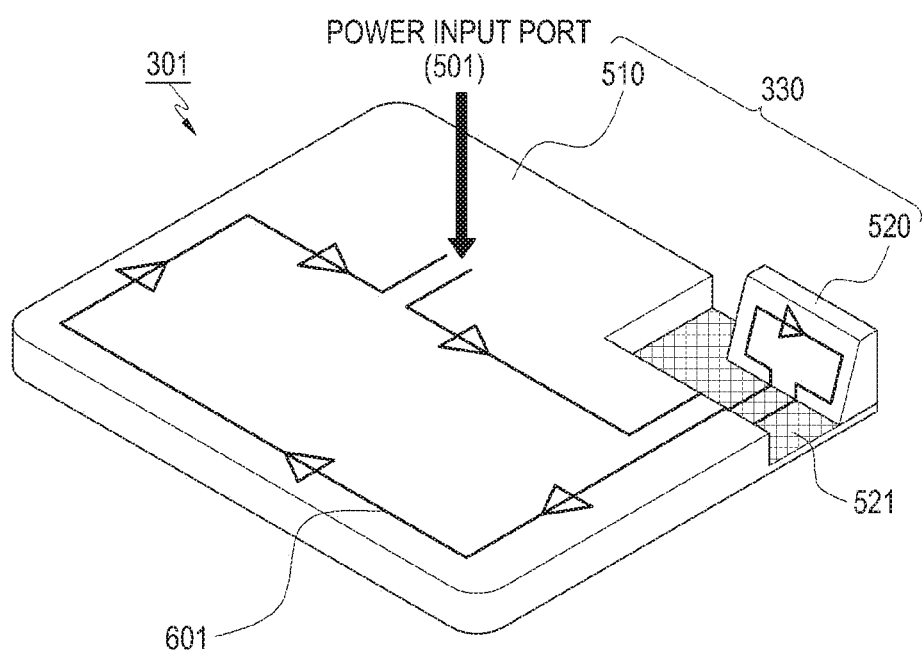
FIG. 6 illustrates a clockwise flow of a current in a charging device, according to an embodiment of the present invention.

FIG. 6 illustrates a clockwise flow of a current in a charging device, according to an embodiment of the present invention.

Referring to FIG. 6, the external power or the power of the battery 340 is supplied to the charging unit 330 of the charging device 301, via a power input port 501. When power is supplied to the charging unit 330, current flows in a clockwise direction, as illustrated by the arrows shown in FIG. 6. That is, the current flows clockwise along a coil 601 embedded in the charging unit 330. It will be assumed that the coil embedded in the first charging unit 510 is wound N times and the coil embedded in the second charging unit 520 is wound M times. Since the coil 601 constitutes a single loop, the power that is input through the power input port 501 may sequentially pass through the area of the first charging unit 510 and the area of the second charging unit 520 along the shape in which the coil is wound.

Figure 7:
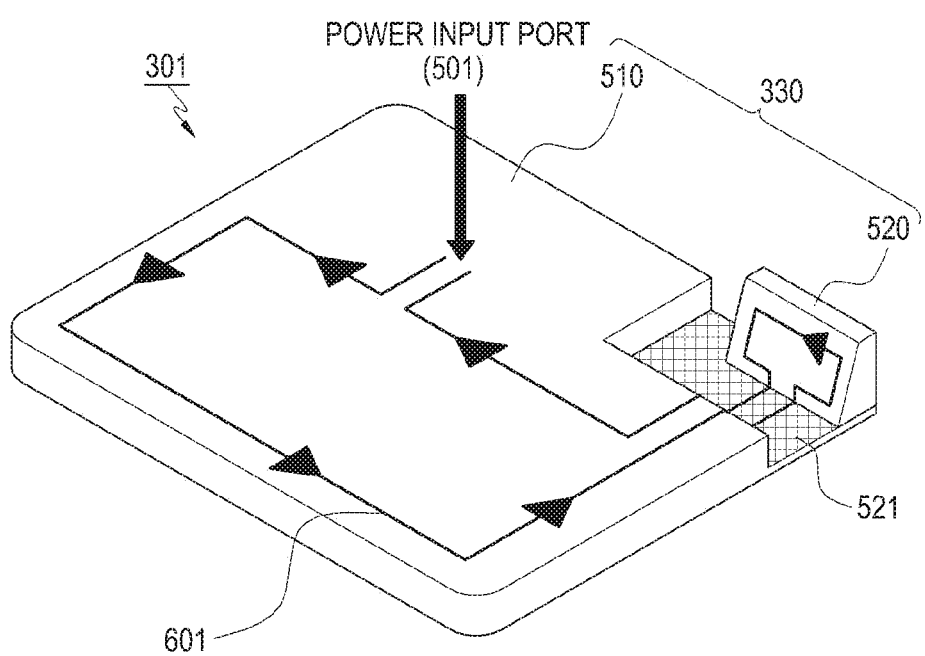
FIG. 7 illustrates a counterclockwise flow of a current in a charging device, according to an embodiment of the present invention.

FIG. 7 illustrates a counterclockwise flow of a current in a charging device, according to an embodiment of the present invention.

Referring to FIG. 7, the external power or the power of the battery 340 may be supplied to the charging unit 330 of the charging device 301, via the power input port 501. When power is supplied to the charging unit 330, current flows in a counterclockwise direction, as illustrated by the arrows shown in FIG. 7. That is, the current flows counterclockwise along the coil 601 embedded in the charging unit 330. It will be assumed that the coil embedded in the first charging unit 510 is wound N times and the coil embedded in the second charging unit 520 is wound M times. Since the coil 601 constitutes a single loop, the power that is input through the power input port 501 may sequentially pass through the area of the first charging unit 510 and the area of the second charging unit 520 along the shape in which the coil is wound.

Figure 8A:
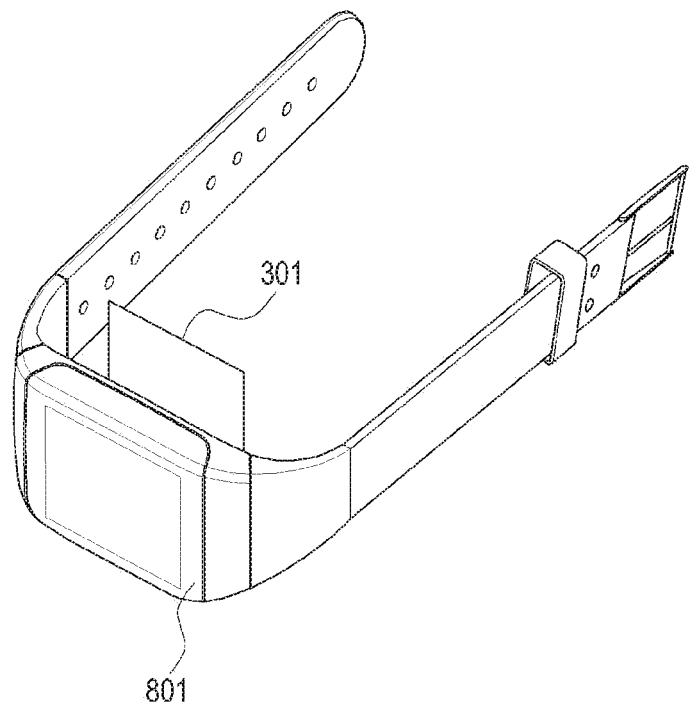
FIGS. 8A and 8B illustrate an electronic device that is charged by a charging device, according to an embodiment of the present invention.
Figure 8B:
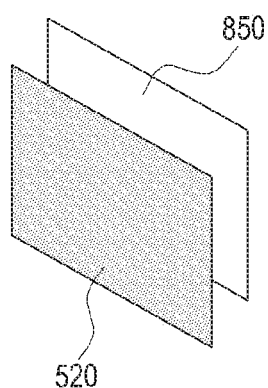

FIGS. 8A and 8B illustrate an electronic device that is charged by a charging device, according to an embodiment of the present invention.

Referring to FIG. 8A, an Rx resonator of a first electronic device 801 that is implemented in the form of a wearable device (e.g., a wristwatch-type device) may be located on the back of the first electronic device 801. As the second charging unit 520 of the charging device 301 is parallel to the first electronic device 801, the Rx resonator of the first electronic device 801 is parallel to the second charging unit 520 (i.e., a part of the Tx resonator of the charging device 301).

Referring to FIG. 8B, an arrangement of the second charging unit 520 of the charging device 301 and an Rx resonator 850 of the first electronic device 801 are illustrated. The Rx resonator 850 is arranged in parallel to the second charging unit 520 including a Tx resonator. A coil for transmission/reception of wireless power is wound, for example, M times, over the area of each of the second charging unit 520 and the Rx resonator 850.

Figure 9:
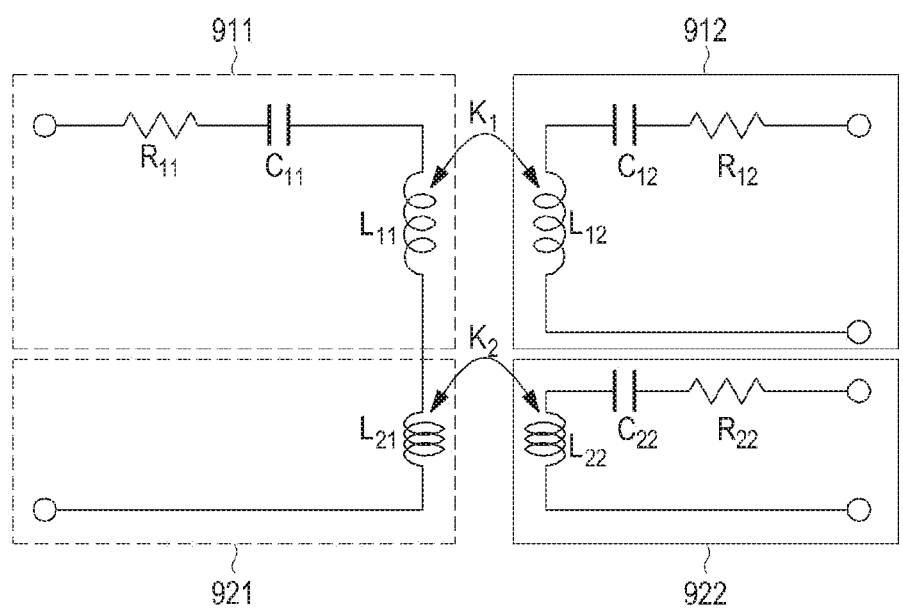
FIG. 9 illustrates impedance circuits of a charging device and of a first and second electronic device that are charged by the charging device, according to an embodiment of the present invention.

FIG. 9 illustrates impedance circuits of a charging device and of a first and second electronic device that are charged by the charging device, according to an embodiment of the present invention.

Referring to FIG. 9, impedance circuits 911 and 921 of the charging device 301 may be matched with an impedance circuit 912 for a first electronic device that can be charged by the first charging unit 510 and an impedance circuit 922 for a second electronic device that can be charged by the second charging unit 520, respectively.

The impedance circuit 911 of the first charging unit 510 may have an impedance value that is the same as that of the impedance circuit 912 of the first electronic device that is charged by the first charging unit 510. The impedance circuit 912 includes a resistor $R_{12}$, a capacitor $C_{12}$ and an inductor $L_{12}$. The impedance circuit 911 of the first charging unit 510 includes a resistor $R_{11}$, a capacitor $C_{11}$ and an inductor $L_{11}$, and is connected to the impedance circuit 921 of the second charging unit 520 in series.

The impedance circuit 921 of the second charging unit 520 may have an impedance value that is the same as that of the impedance circuit 922 of the second electronic device that is charged by the second charging unit 520. The impedance circuit 922 includes a resistor $R_{22}$, a capacitor $C_{22}$ and an inductor $L_{22}$. The impedance circuit 921 of the second charging unit 520 includes a resistor $R_{21}$, a capacitor $C_{21}$ and an inductor $L_{21}$, and is connected to the impedance circuit 911 of the first charging unit 510 in series.

Since the impedance circuit 911 of the first charging unit 510 and the impedance circuit 921 of the second charging unit 520 are connected in series, the power supplied from the charging device 301 to the first and second electronic devices may be distributed to the first and second electronic devices in proportion to the impedance values of the impedance circuits 911 and 921. A ratio of the power supplied by the first charging unit 510 to the power supplied by the second charging unit 520 may be represented as K1:K2.

Figure 10:
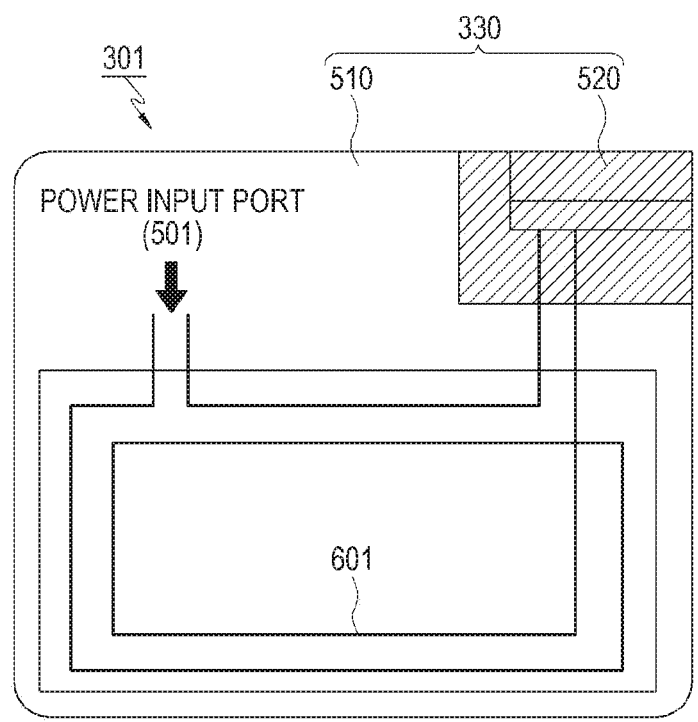
FIG. 10 illustrates a charging device, according to various an embodiment of the present invention.

FIG. 10 illustrates a charging device, according to an embodiment of the present invention.

Referring to FIG. 10, the charging unit 330 of the charging device 301 includes the first charging unit 510 and the second charging unit 520. The coil 601 is wound over the entire area of the first charging unit 510 and the second charging unit 520. The current of the power that is input to the charging device 301 through the power input port 501 may be converted into an AC current by the Tx resonator. The AC current may be delivered to one or more electronic devices that are adjacent to the charging device 301, through the coil 601.

Figure 11A:
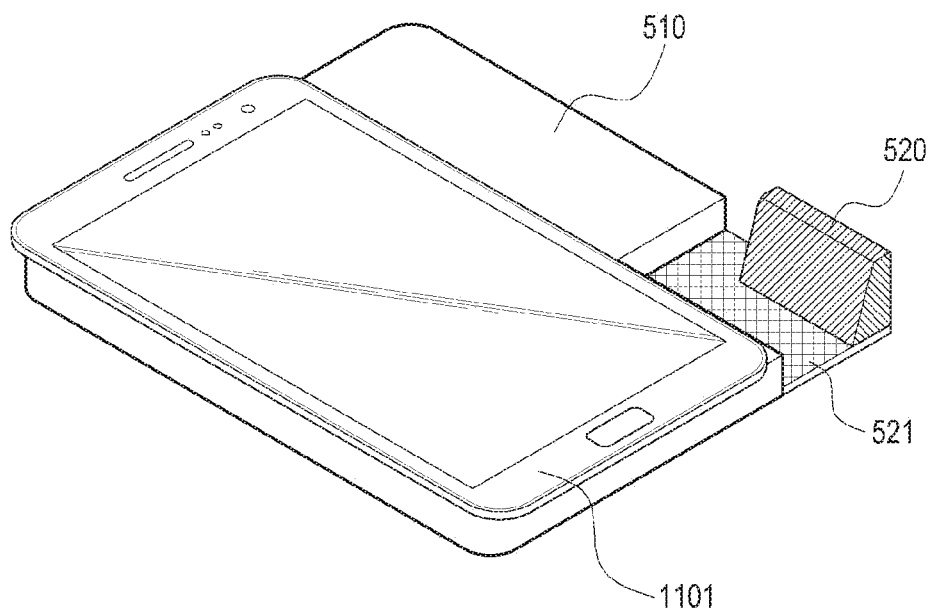
FIGS. 11A and 11B illustrate electronic devices that are charged by a charging device 301, according to an embodiment of the present invention.
Figure 11B:
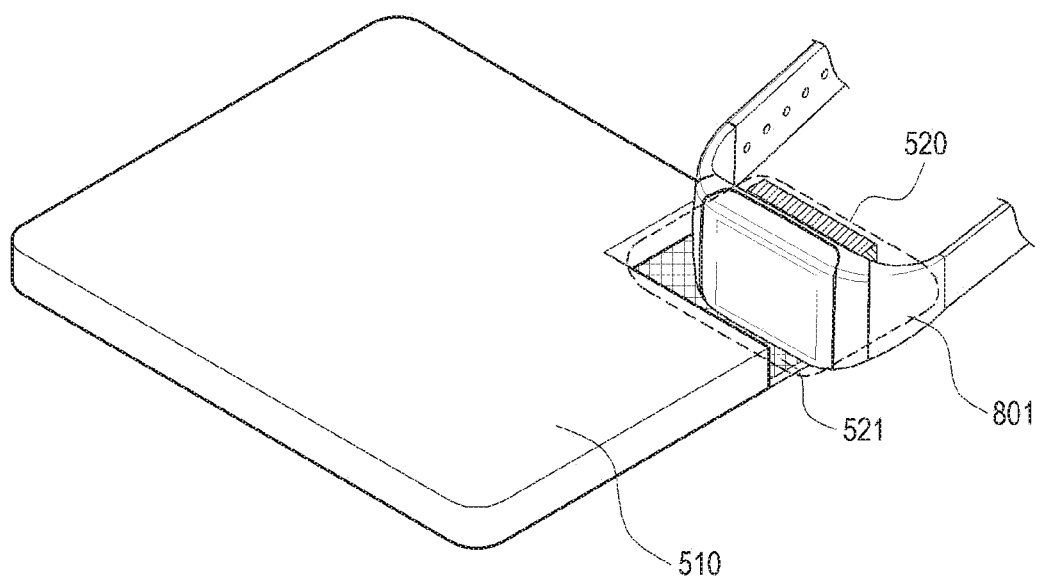

FIGS. 11A and 11B illustrate electronic devices that are charged by a charging device 301, according to an embodiment of the present invention.

Referring to FIG. 11A, an Rx resonator of the second electronic device 1101 may be arranged in a face-to-face manner to be in parallel to a Tx resonator included in the first charging unit 510. Since the Rx resonator of the second electronic device 1101 is arranged to face the Tx resonator of the first charging unit 510 in a face-to-face manner, the second electronic device 1101 receives wireless power from the Tx resonator that is arranged to face the Rx resonator of the second electronic device 1101.

Referring to FIG. 11B, when the first electronic device 801 is inserted into the groove 521 of the second charging unit 520, the first electronic device 801 is perpendicular to the first charging unit 510 and parallel to the second charging unit 520. In other words, the Rx resonator of the first electronic device 801 is arranged to face the Tx resonator included in the second charging unit 520 in a face-to-face manner. Since the Rx resonator of the first electronic device 801 is arranged to face the Tx resonator of the second charging unit 520, the first electronic device 801 receives wireless power from the Tx resonator that is arranged to face the Rx resonator of the first electronic device 801.

Figure 12A:
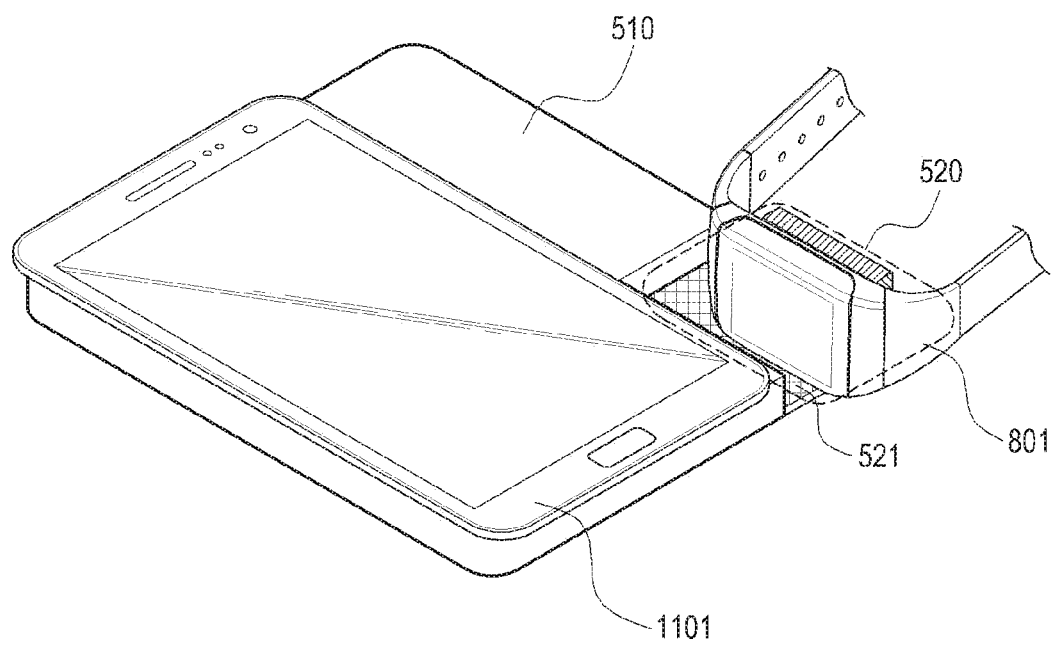
FIGS. 12A and 12B illustrate electronic devices that are simultaneously charged by a charging device, according to an embodiment of the present invention.
Figure 12B:
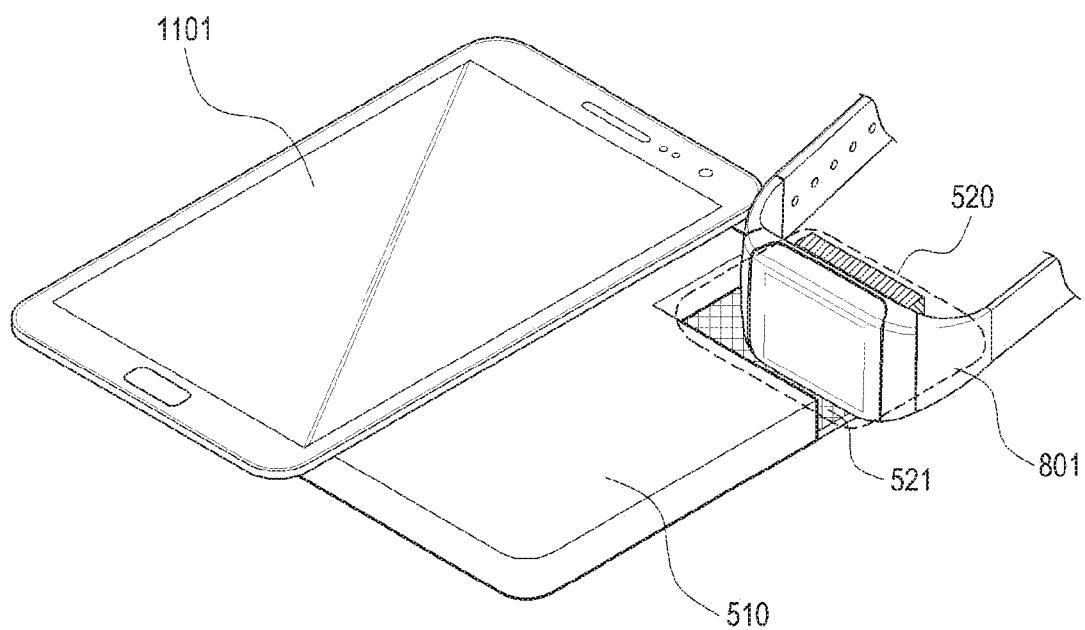

FIGS. 12A and 12B illustrate electronic devices that are simultaneously charged by a charging device, according to an embodiment of the present invention.

Referring to FIGS. 12A and 12B, first electronic device 801 and the second electronic device 1101 are simultaneously charged by the charging device 301. In this case, the Rx resonator of the second electronic device 1101 is arranged in a face-to-face manner to be in parallel to the Tx resonator included in the first charging unit 510. Since the Rx resonator of the second electronic device 1101 is arranged to face the Tx resonator of the first charging unit 510, the second electronic device 1101 receives wireless power from the Tx resonator that is arranged to face the Rx resonator of the second electronic device 1101.

When the first electronic device 801 is inserted into the groove 521 of the second charging unit 520, the first electronic device 801 is perpendicular to the first charging unit 510 and parallel to the second charging unit 520. In other words, the Rx resonator of the first electronic device 801 is arranged to face the Tx resonator included in the second charging unit 520. Since the Rx resonator of the first electronic device 801 is arranged to face the Tx resonator of the second charging unit 520, the first electronic device 801 receives wireless power from the Tx resonator that is arranged to face the Rx resonator of the first electronic device 801.

Since the coil included in the charging unit 330, which constitutes a single loop, passes through both of the first charging unit 510 and the second charging unit 520, the power that is input through the power input port 501 of the charging device 301 may be delivered to the first electronic device 801 and the second electronic device 1101 at the same time. In other words, the user may charge the first electronic device 801 and the second electronic device 1101 at the same time by putting the first electronic device 801 and the second electronic device 1101 on the charging device 301 at the same time.

Figure 13:
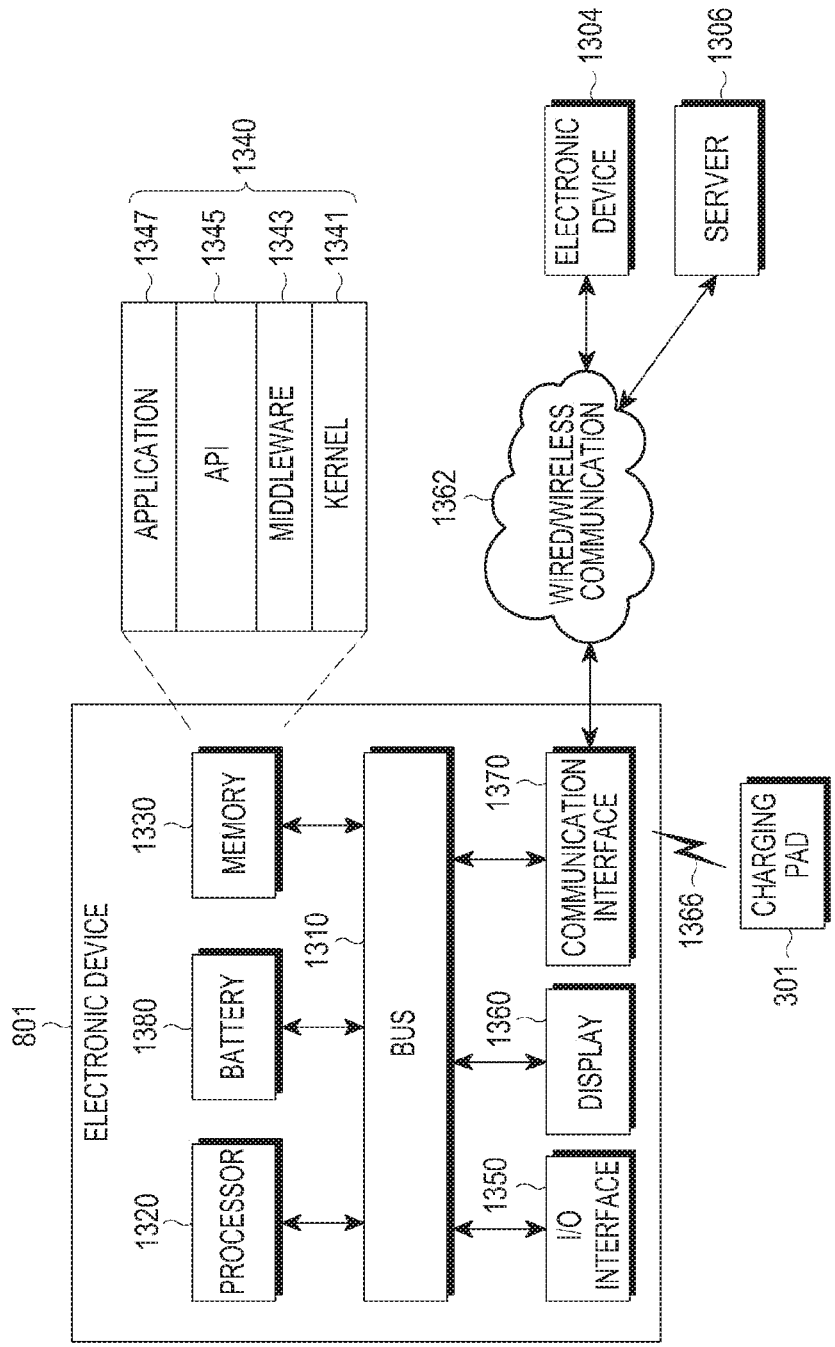
FIG. 13 illustrates a network environment including an electronic device, according to an embodiment of the present invention.

FIG. 13 illustrates a network environment including an electronic device, according to an embodiment of the present invention.

Referring to FIG. 13, the electronic device 801 is provided. The electronic device 801 includes a bus 1310, a processor 1320, a memory 1330, an Input/Output (I/O) interface 1350, a display 1360, a communication interface 1370, and a battery 1380. In certain embodiments, the electronic device 801 may omit at least one of the above components, or may further include other components.

The bus 1310 includes a circuit for connecting the above components 1320 to 1380 to each other and delivering communication signals (e.g., control message and/or data) between the components 1320 to 1380.

The processor 1320 includes one or more of a Central Processing Unit (CPU), an Application Processor (AP) or a Communication Processor (CP). The processor 1320 performs, for example, a control and/or communication operation or data processing for at least one other component of the electronic device 801.

The processor 1320 controls the electronic device 801 so that if charging starts, the electronic device 801 receives wireless power from the charging device 301. The processor 1320 determines whether the charging of the electronic device 801 is completed. If the charging is completed, the processor 1320 may terminate the reception of wireless power from the charging device 301. In addition, the processor 1320 determines whether power consumption has occurred. If power consumption has occurred, the processor 1320 controls the electronic device 801 so that the electronic device 801 may resume the reception of wireless power from the charging device 301.

The memory 1330 may include a volatile and/or non-volatile memory. The memory 1330 may store, for example, a command or data related to at least one other component of the electronic device 801. The memory 1330 may store software and/or program 1340. The program 1340 includes, for example, a kernel 1341, a middleware 1343, an Application Programming Interface (API) 1345, and/or an application 1347. Some of the kernel 1341, the middleware 1343 or the API 1345 may be referred to as an Operating System (OS).

The kernel 1341 controls or manages the system resources (e.g., the bus 1310, the processor 1320, and the memory 1330) used to execute an operation or function that is implemented in other components of the memory 1330 (e.g., the middleware 1343, the API 1345 or the application 1347). In addition, the kernel 1341 may provide an interface that can control or manage the system resources as the middleware 1343, the API 1345 or the application 1347 access an individual component of the electronic device 801.

The middleware 1343 plays an intermediary role so that the API 1345 or the application program 1347 may communicate with the kernel 1341 to exchange data with each other. In addition, with regard to the work requests received from the application 1347, the middleware 1343 performs control (e.g., scheduling or load balancing) for the work requests, using a method of assigning a priority for using the system resources (e.g., the bus 1310, the processor 1320, the memory 1330, etc.) of the electronic device 801 to at least one application 1347.

The API 1345 includes at least one interface or function (e.g., a command) for file control, window control, image processing or character control, as an interface by which the application 1347 controls the function provided in the kernel 1341 or the middleware 1343.

The I/O interface 1350 plays a role of an interface capable of delivering a command or data received from the user or other external device to the other components of the electronic device 801. In addition, the I/O interface 1350 outputs the command or data received from the other components of the electronic device 801 to the user or to an external electronic device 1304 or server 1306.

The display 1360 includes, for example, a Liquid Crystal Display (LCD) display, a Light Emitting Diode (LED) display, an Organic Light Emitting Diode (OLED) display, a Micro-Electromechanical Systems (MEMS) display, or an electronic paper display. The display 1360 displays various content (e.g., text, image, video, icon, symbol, etc.), for the user. The display 1360 may include a touch screen, and may receive, for example, a touch input, a gesture input, a proximity input, or a hovering input that is made on the touch screen by an electronic pen or a part of the user's body.

The communication interface 1370 may set up communication between the electronic device 801 and an external electronic device 1304 or a server 1306. For example, the communication interface 1370 may be connected to the networks 1362 or 1366 through wired communication or wireless communication to communicate with the charging pad 301, an external electronic device 1304, or the server 1306.

The wireless communication includes as a cellular communication protocol, at least one of Long Term Evolution (LTE), Long Term Evolution-Advanced (LTE-A), Code Division Multiple Access (CDMA), Wideband Code Division Multiple Access (WCDMA), Universal Mobile Telecommunications System (UMTS), Wireless Broadband (Wi-Bro), and Global System for Mobile communications (GSM).

The wired communication includes at least one of Universal Serial Bus (USB), High Definition Multimedia Interface (HDMI), Recommended Standard 232 (RS-232), or Plain Old Telephone Service (POTS).

The network 1362 includes, as a telecommunications network at least one of a computer network (e.g., Local Area Network (LAN) or Wide Area Network (WAN)), the Internet, and a telephone network.

The external electronic device 1304 may be a device that is the same or a different type from the electronic device 801. In one embodiment, the server 1306 includes a group of one or more servers.

According to various embodiments of the present invention, all or some of operations performed in the electronic device 801 may be performed in another electronic device or in multiple electronic devices (e.g., the external electronic device 1304, or the server 1306). In one embodiment, if the electronic device 801 performs any function or service automatically or by request, the electronic device 801 may additionally request some functions associated therewith from the external electronic device 1304, or the server 1306), instead of performing the function or service itself In this case, the other electronic devices (e.g., the external electronic device 1304 or the server 1306) may perform the requested function or additional function, and deliver the results to the electronic device 801. The electronic device 801 may provide the requested function or service by processing the received results as provided or may perform additional processing. To this end, for example, computing, distributed computing, or client-server computing technology may be used.

In accordance an aspect of the present invention, an electronic device for receiving wireless power is provided. The electronic device includes a processor configured to determine whether power supply from a charging device is started, and to run a clock mode if the power supply is started, and a display configured to display at least one of a date, a day, a current time and weather in the clock mode.

Figure 14:
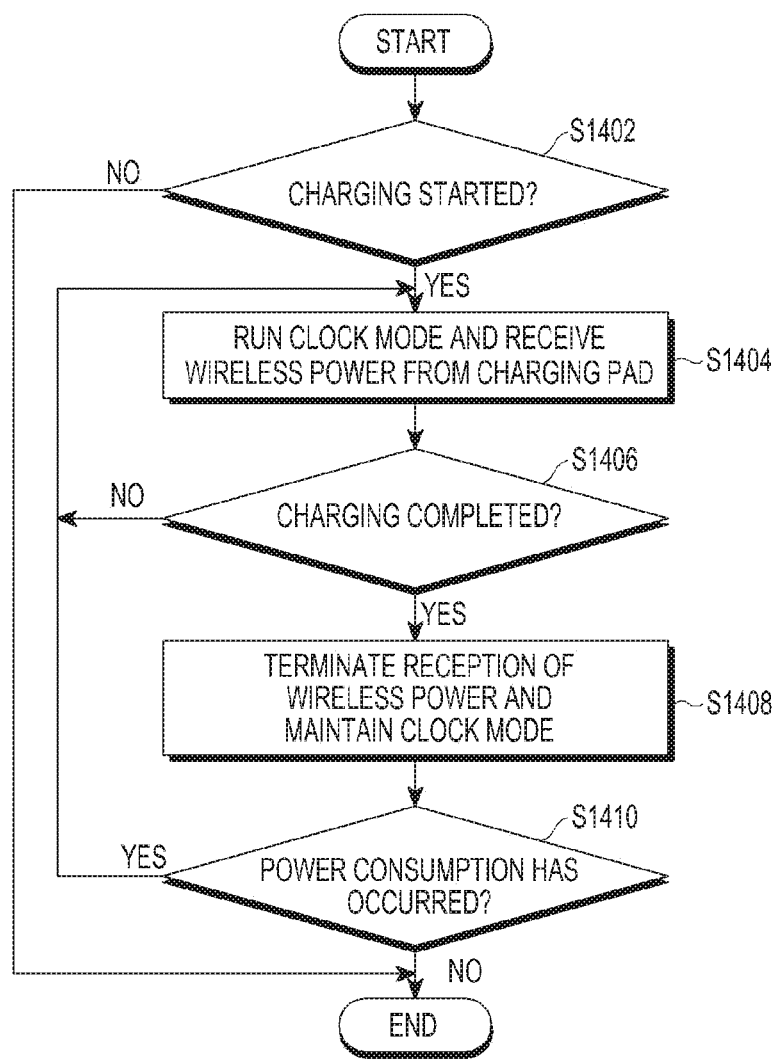
FIG. 14 is a flowchart illustrating a charging method of an electronic device, according to an embodiment of the present invention.

FIG. 14 is a flowchart illustrating a charging method of an electronic device, according to an embodiment of the present invention.

Referring to FIG. 14, the processor 1320 of electronic device 801 determines in step S1402 whether charging is started. Electronic device 801 may be a device such as the first electronic device 801 that is implemented as a wristwatch-type wearable device. If the electronic device 801 is placed in the groove 521 so that the electronic device 801 may come in contact with the charging unit 330 of the charging device 301, the charging of the electronic device 801 may be automatically started by an Rx resonator included in the battery 1380 and a Tx resonator included in the charging unit 330. The processor 1320 then determines whether the charging of the electronic device 801 is automatically started.

If it is determined in step S1402 that the charging is started, the processor 1320 runs the clock mode and controls the electronic device 801 to continuously receive wireless power from the charging device 301 in operation S1404. The term 'clock mode' refers to an operation mode in which the electronic device 801 continuously displays at least one of date, day, current time, and weather on the display 1360.

The processor 1320 controls the display 1360 to display the remaining capacity of the battery being charged, in real time.

If it is determined in step S1402 that the charging is not started, the processor 1320 controls an operation of the electronic device 801 to maintain the current status without performing any separate operation.

Thereafter, the processor 1320 determines in step S1406 whether the charging is completed.

If it is determined in step S1406 that the charging is completed, the processor 1320 may terminate the reception of wireless power for the charging device 801 in step S1408. In step S1408, the processor 1320 controls the electronic device 801 to maintain the clock mode. In other words, in step S1408, even though the electronic device 801 terminates the charging operation, the electronic device 801 continuously displays at least one of the date, day, current time, and weather on the display 1360. The clock mode may be maintained when the distance between the electronic device 801 and the charging device 301 is less than the distance in which the electronic device 801 cannot receive wireless power supplied from the charging device 301, referred to hereinafter as the charging-impossible distance.

If it is determined in step S1406 that the charging is not completed, the processor 1320 may continue running the clock mode, and receive wireless power supplied from the charging device 301 in step S1404.

The processor 1320 determines in step S1410 whether power consumption of the electronic device 801 has occurred after the charging was completed.

If it is determined in step S1410 that power consumption has occurred, the processor 1320 again receives wireless power from the charging device 301 in step S1404.

If it is determined in step S1410 that power consumption has not occurred, the processor 1320 controls the electronic device 801 to maintain the current status without performing any separate operation. Step S1410 may be continuously performed when the distance between the electronic device 801 and the charging device 301 is less than or equal to the charging-impossible distance. For example, if the distance between the electronic device 801 and the charging device 301 is less than or equal to the charging-impossible distance, the processor 1320 checks whether power consumption has occurred in the electronic device 801 during every predetermined reference cycle.

In accordance with an aspect of the present invention, an electronic device for receiving wireless power is provided. The electronic device includes a processor configured to determine whether power supply from a charging device is started, and to run a clock mode if the power supply is started, and a display configured to display at least one of a date, a day, a current time and weather in the clock mode FIG. 15 illustrates an electronic device that is charged by a charging device, according to an embodiment of the present invention.

Figure 15:
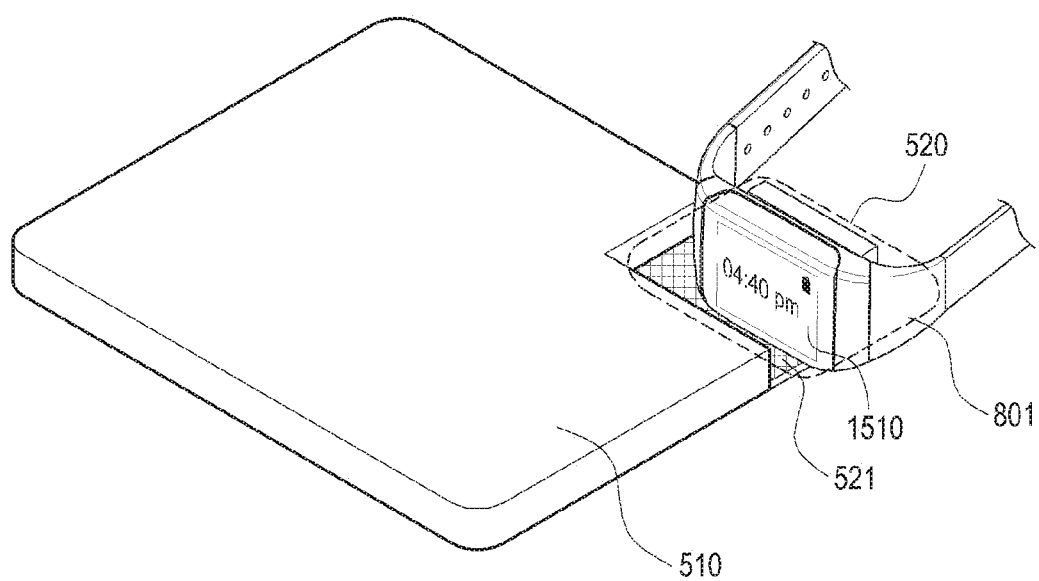
FIG. 15 illustrates an electronic device that is charged by a charging device, according to an embodiment of the present invention.

Referring to FIG. 15, the first electronic device 801, which is implemented as a wristwatch-type wearable device, is inserted into the groove 521 of the second charging unit 520 of the charging device 301. If the first electronic device 801 is arranged as shown in FIG. 15, the Rx resonator of the first electronic device 801 is located to face a part of the Tx resonator of the charging unit 301 in a face-to-face manner. In other words, in this arrangement, the area where the coil included in the Rx resonator of the first electronic device 801 is located may be the same as or similar to the area where the coil included in the Tx resonator is located. The amount of power that the first electronic device 801 receives from the charging device 301 is proportional to the area where the Rx resonator and the Tx resonator are located when arranged in a fact-to-face manner. Since the area of the rear of the first electronic device 801 illustrated in FIG. 15 is the same as or similar to the area of the second charging unit 520, the first electronic device 801 may be fully charged in a relatively short time.

The first electronic device 801 runs the clock mode 1510 while receiving the wireless power supplied from the charging device 301. Even after the first electronic device 801 is fully charged, the first electronic device 801 continues to run the clock mode 1510. The clock mode 1510 is released if the first electronic device 801 and the charging device 301 are separated from each other. Additionally, the first electronic device 801 may notify the user of the start of charging or the completion of charging on the display 1360.

Figure 16:
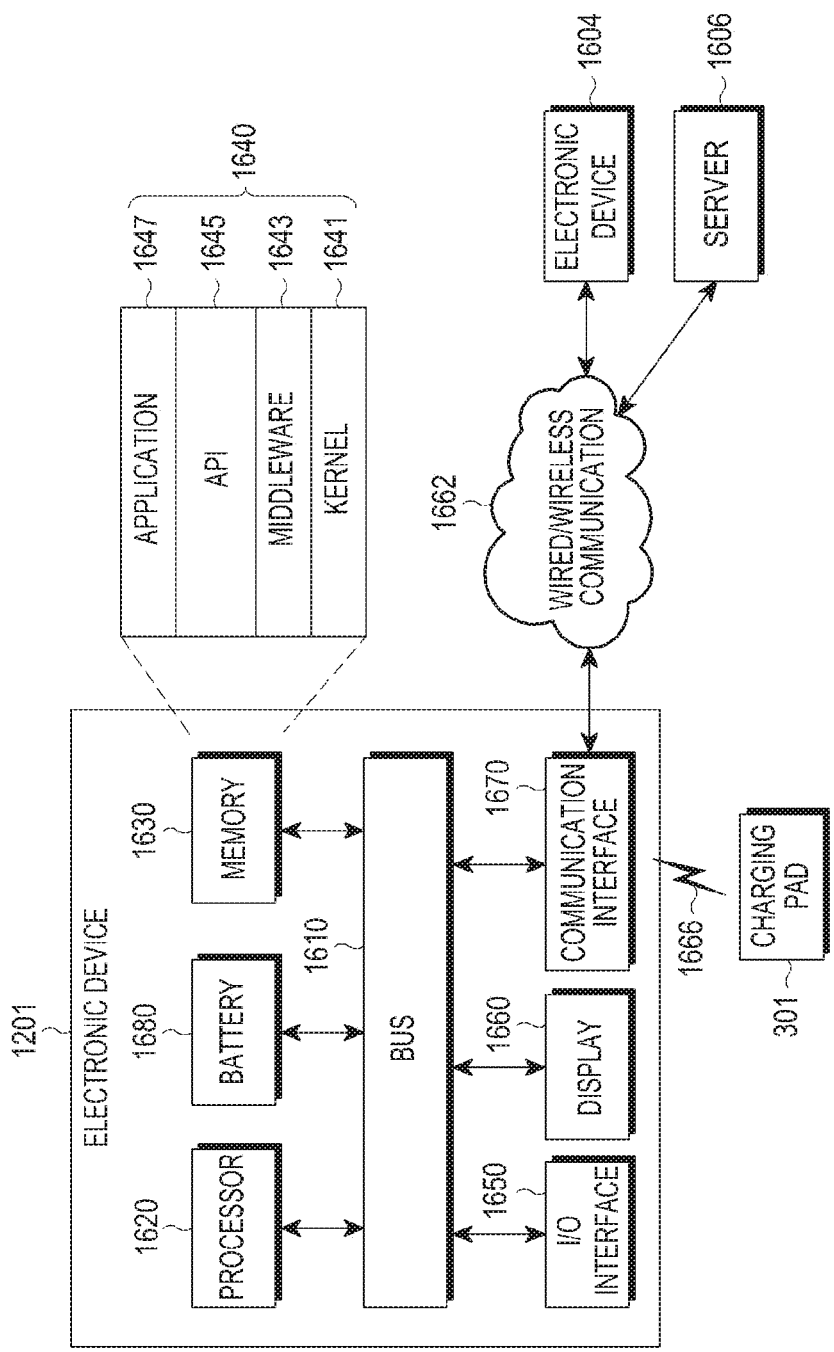
FIG. 16 illustrates a network environment including an electronic device, according to an embodiment of the present invention.

FIG. 16 illustrates a network environment including an electronic device, according to an embodiment of the present invention.

Referring to FIG. 16, an electronic device 1101 is provided. The electronic device 1101 includes a bus 1610, a processor 1620, a memory 1630, an Input/Output (I/O) interface 1650, a display 1660, a communication interface 1670, and a battery 1680. In certain embodiments, the electronic device 1101 may omit at least one of the above components, or may further include other components.

The bus 1610 includes a circuit for connecting the above components 1620 to 1680 to each other and delivering communication signals (e.g., control message and/or data) between the components 1620 to 1680.

The processor 1620 includes one or more of a Central Processing Unit (CPU), an Application Processor (AP) or a Communication Processor (CP). The processor 1620 performs, for example, a control and/or communication operation or data processing for at least one other component of the electronic device 1101.

The processor 1620 controls the electronic device 1101 so that if charging starts, the electronic device 1101 receives wireless power from the charging device 301. The processor 1620 determines whether the charging of the electronic device 1101 is completed. If the charging is completed, the processor 1620 may terminate the reception of wireless power from the charging device 301. In addition, the processor 1620 determines whether power consumption has occurred. If power consumption has occurred, the processor 1620 controls the electronic device 1101 so that the electronic device 1101 may resume the reception of wireless power from the charging device 301.

The memory 1630 may include a volatile and/or non-volatile memory. The memory 1630 stores, for example, a command or data related to at least one other component of the electronic device 1101. The memory 1630 may store software and/or program 1640. The program 1640 includes, for example, a kernel 1641, a middleware 1643, an Application Programming Interface (API) 1645, and/or an application 1647. Some of the kernel 1641, the middleware 1643 or the API 1645 may be referred to as an Operating System (OS).

The kernel 1641 controls or manages the system resources (e.g., the bus 1610, the processor 1620, and the memory 1630) used to execute an operation or function that is implemented in other components of the memory 1630 (e.g., the middleware 1643, the API 1645 or the application 1647). In addition, the kernel 1641 may provide an interface that can control or manage the system resources as the middleware 1643, the API 1645 or the application 1647 access an individual component of the electronic device 1101.

The middleware 1643 plays an intermediary role so that the API 1645 or the application program 1647 may communicate with the kernel 1641 to exchange data with each other. In addition, with regard to work requests received from the application 1647, the middleware 1643 performs control (e.g., scheduling or load balancing) for the work requests, using a method of assigning a priority for using the system resources (e.g., the bus 1610, the processor 1620, the memory 1630, etc.) of the electronic device 1101 to at least one application 1647.

The API 1645 includes at least one interface or function (e.g., a command) for file control, window control, image processing or character control, as an interface by which the application 1647 controls the function provided in the kernel 1641 or the middleware 1643.

The I/O interface 1650 plays a role of an interface capable of delivering a command or data received from the user or other external device to the other components of the electronic device 1101. In addition, the I/O interface 1650 outputs the command or data received from the other components of the electronic device 1101 to the user or to an external electronic device 1604 or server 1606.

The display 1660 includes, for example, a Liquid Crystal Display (LCD) display, a Light Emitting Diode (LED) display, an Organic Light Emitting Diode (OLED) display, a Micro-Electromechanical Systems (MEMS) display, or an electronic paper display. The display 1660 displays various content (e.g., text, image, video, icon, symbol, etc.), for the user. The display 1660 may include a touch screen, and may receive, for example, a touch input, a gesture input, a proximity input, or a hovering input that is made on the touch screen by an electronic pen or a part of the user's body.

The communication interface 1670 sets up communication between the electronic device 1101 and an external electronic device 1604 or a server 1606. For example, the communication interface 1670 may be connected to the networks 1662 or 1666 through wired communication or wireless communication to communicate with the charging pad 301, an external electronic device 1604, or the server 1606.

The wireless communication includes as a cellular communication protocol, at least one of Long Term Evolution (LTE), Long Term Evolution-Advanced (LTE-A), Code Division Multiple Access (CDMA), Wideband Code Division Multiple Access (WCDMA), Universal Mobile Telecommunications System (UMTS), Wireless Broadband (WiBro), and Global System for Mobile communications (GSM).

The wired communication includes at least one of Universal Serial Bus (USB), High Definition Multimedia Interface (HDMI), Recommended Standard 232 (RS-232), or Plain Old Telephone Service (POTS).

The network 1662 includes, as a telecommunications network at least one of a computer network (e.g., Local Area Network (LAN) or Wide Area Network (WAN)), the Internet, and a telephone network.

The external electronic device 1604 may be a device that is the same or a different type from the electronic device 1101. In one embodiment, the server 1606 includes a group of one or more servers.

According to various embodiments of the present invention, all or some of the operations performed in the electronic device 1101 may be performed in another electronic device or in multiple electronic devices (e.g., the external electronic device 1604, or the server 1606). In one embodiment, if the electronic device 1101 performs any function or service automatically or by request, the electronic device 1101 may additionally request some functions associated therewith from the external electronic device 1604, or the server 1606, instead of performing the function or service itself. In this case, the other electronic devices (e.g., the external electronic device 1604 or the server 1606) may perform the requested function or additional function, and deliver the results to the electronic device 1101. The electronic device 1101 may provide the requested function or service by processing the received results as provided or may perform additional processing. To this end, for example, computing, distributed computing, or client-server computing technology may be used.

Figure 17:
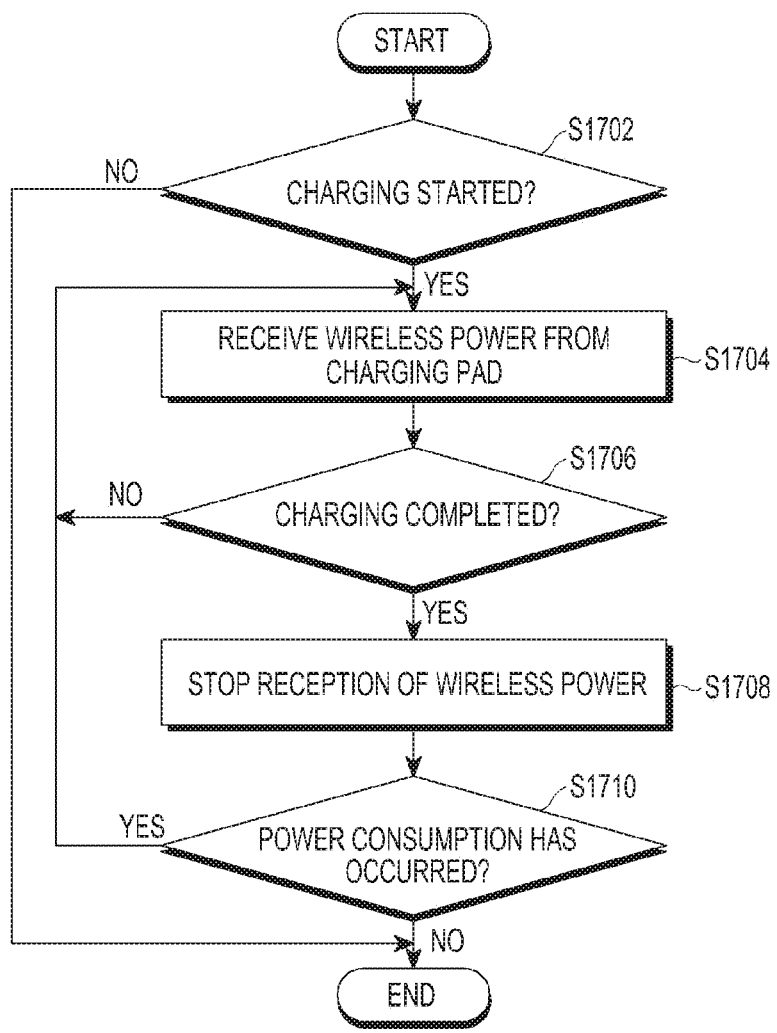
FIG. 17 is a flowchart illustrating a charging method of an electronic device, according to an embodiment of the present invention.

FIG. 17 is a flowchart illustrating a charging method of an electronic device, according to an embodiment of the present invention.

Referring to FIG. 17, the processor 1320 of electronic device 801 determines in step S1702 whether charging is started. Electronic device 801, may be a device such as the second electronic device 1101 implemented as a smart phone. If the electronic device 801 is placed on the charging unit 330 of the charging device 301, the charging of the electronic device 801 may be automatically started by an Rx resonator included in the battery 1380 and a Tx resonator included in the charging unit 330. The processor 1320 determines whether the charging of the electronic device 801 is automatically started.

If it is determined in step S1702 that the charging is started, the processor 1320 continuously receives wireless power from the charging device 301 in step S1704. The processor 1320 performs a charging mode as an operation mode of the electronic device 801. The 'charging mode' refers to an operation mode in which the electronic device 801 receives power through wired/wireless communication. The processor 1320 controls the display 1360 to display the remaining capacity of the battery being charged, in real time.

If it is determined in step S1702 that the charging is not started, the processor 1320 controls an operation of the electronic device 801 to maintain the current status without performing any separate operation.

Thereafter, the processor 1320 determines in step S1706 whether the charging is completed. If it is determined in step S1706 that the charging is completed, the processor 1320 may terminate the reception of wireless power for the charging device 801 in step S1708. If it is determined in step S1706 that the charging is not completed, the processor 1320 continuously receives wireless power from the charging device 301 in step S1704.

The processor 1320 determines in step S1710 whether power consumption of the electronic device 801 has occurred.

If it is determined in step S1710 that power consumption has occurred, the processor 1320 again receives wireless power from the charging device 301 in step S1704.

If it is determined in step S1710 that power consumption has not occurred, the processor 1320 controls the electronic device 801 to maintain the current status without performing any separate operation.

If the electronic device 801 is located within a predetermined reference radius of the charging unit 330 of the charging device 301, (e.g., if the electronic device 801 is in the vicinity of the charging device 301), the electronic device 801 may be automatically charged wirelessly by the charging device 301 each time power consumption occurs.

Figure 18:
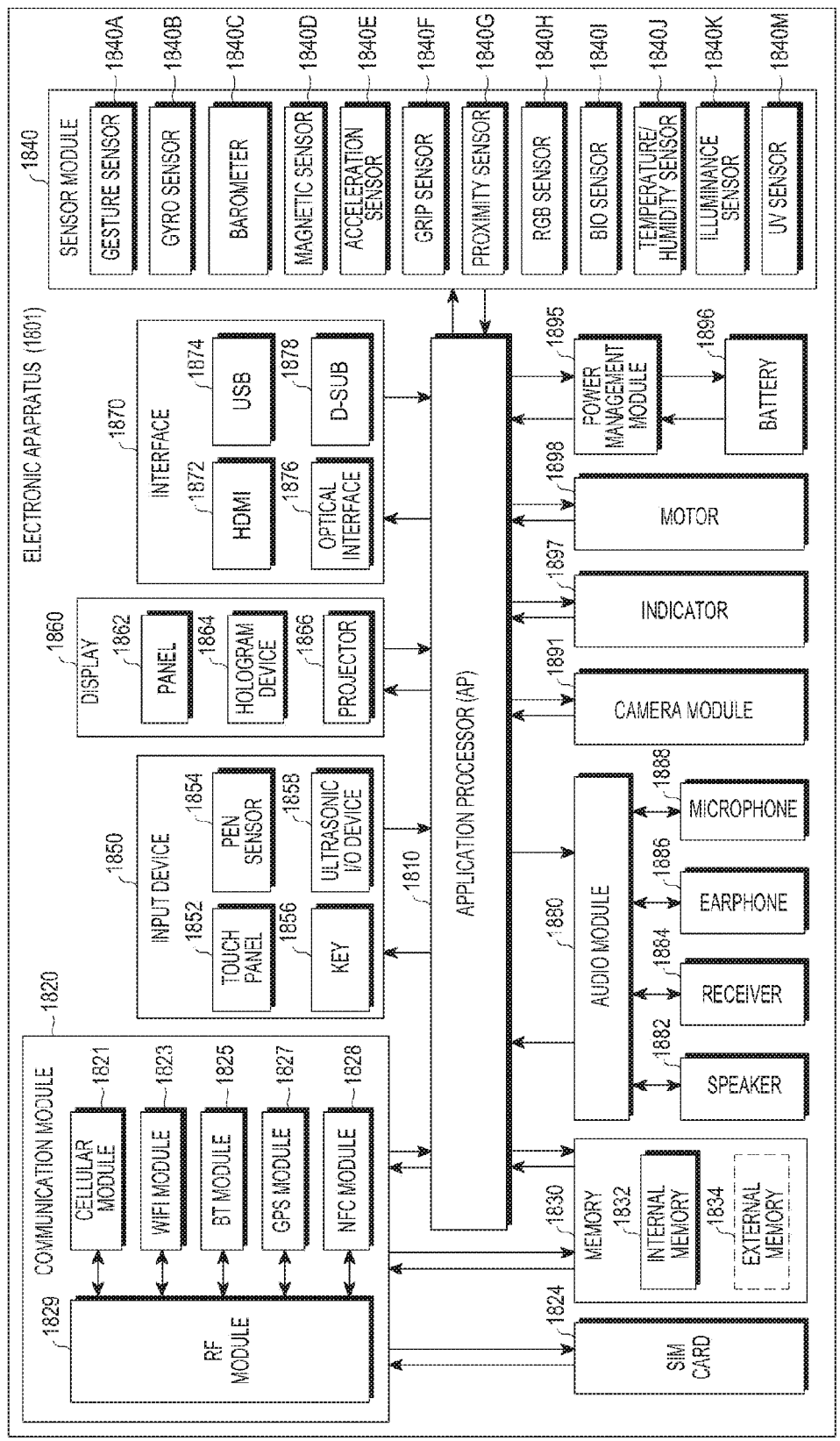
FIG. 18 is a block diagram of an electronic device, according to an embodiment of the present invention.

FIG. 18 is a block diagram of an electronic device, according to an embodiment of the present invention. Referring to FIG. 18, an electronic device 1801 is provided. The electronic device 1801 includes, for example, the whole or part of the second electronic device 1101 illustrated in FIGS. 11A to 12B, 13 and 16. The electronic device 1801 includes one or more Application Processors (APs) 1810, a communication module 1820, a Subscriber Identification Module (SIM) card 1824, a memory 1830, a sensor module 1840, an input device 1850, a display 1860, an interface 1870, an audio module 1880, a camera module 1891, a power management module 1895, a battery 1896, an indicator 1897, and a motor 1898.

The AP 1810 runs an operating system or an application program to control a plurality of hardware or software components connected to the AP 1810, and to perform various data processing and operations. The AP 1810 may be implemented as a System on Chip (SoC). The AP 1810 may further include a Graphic Processing Unit (GPU) and/or an image signal processor. The AP 1810 may include some (e.g., a cellular module 1821) of the components illustrated in FIG. 17. The AP 1810 may load a command or data received from at least one of the other components (e.g., a non-volatile memory) to a volatile memory, process the loaded command or data, and store various data in the non-volatile memory.

The communication module 1820 may have the structure that is the same as or similar to the communication interface 1370 illustrated in FIG. 13. The communication module 1820 includes the cellular module 1821, a WIFI module 1823, a Bluetooth (BT) module 1825, a GPS module 1827, an NFC module 1828, and a Radio Frequency (RF) module 1829.

The cellular module 1821 provides a voice call service, a video call service, a messaging service, or an Internet service over a communication network. The cellular module 1821 performs identification and authentication of the electronic device 1801 in the communication network using a SIM card 1824. The cellular module 1821 performs some of the functions that can be provided by the AP 1810. The cellular module 1821 may include a Communication Processor (CP).

The WIFI module 1823, the BT module 1825, the GPS module 1827, and the NFC module 1828 may each include a processor for processing the data that is transmitted or received through the corresponding module. In some embodiments, some of the cellular module 1821, the WIFI module 1823, the BT module 1825, the GPS module 1827, or the NFC module 1828 may be incorporated into one Integrated Chip (IC) or IC package.

The RF module 1829 transmits and receives a communication signal (e.g., an RF signal). The RF module 1829 may include a transceiver, a Power AMP Module (PAM), a frequency filter, a Low Noise Amplifier (LNA), or an antenna. At least one of the cellular module 1821, the WIFI module 1823, the BT module 1825, the GPS module 1827, or the NFC module 1828 may transmit and receive an RF signal through a separate RF module 1829.

The SIM card 1824 is a card with a subscriber identification module, and/or an embedded SIM, and includes unique identification information (e.g., Integrated Circuit Card Identifier (ICCID)) or subscriber information (e.g., International Mobile Subscriber Identity (IMSI)).

The memory 1830 (e.g., the memory 1730) may include an internal memory 1832 or an external memory 1834.

The internal memory 1832 may include at least one of a volatile memory (e.g., Dynamic RAM (DRAM), Static RAM (SRAM), Synchronous Dynamic RAM (SDRAM), etc.) and a non-volatile memory (e.g., One Time Programmable ROM (OTPROM), Programmable ROM (PROM), Erasable and Programmable ROM (EPROM), Electrically EPROM(EEPROM), mask ROM, flash ROM, flash memory (e.g., NAND flash, NOR flash or the like), hard drive, or Solid State Drive (SSD)).

The external memory 1834 may include a flash drive (e.g., Compact Flash (CF), Secure Digital (SD), Micro Secure Digital (Micro-SD), Mini Secure Digital (Mini-SD), extreme Digital (xD), or a memory stick. The external memory 1834 may be functionally and/or physically connected to the electronic device 1801 through various interfaces.

The sensor module 1840 measures a physical quantity or senses the operating status of the electronic device 1801, and converts the measured or sensed information into an electrical signal. The sensor module 1840 includes at least one of a gesture sensor 1840A, a gyro sensor 1840B, a barometer 1840C, a magnetic sensor 1840D, an acceleration sensor 1840E, a grip sensor 1840F, a proximity sensor 1840G a color sensor (e.g., a Red-Green-Blue (RGB) sensor) 1840H, a bio sensor 1840I, a temperature/humidity sensor 1840J, an illuminance sensor 1840K, or a Ultra Violet (UV) sensor 1840M. Additionally or alternatively, the sensor module 1840 may include an Electronic-nose (E-nose) sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 1840 may further include a control circuit for controlling one or more sensors belonging thereto. The electronic device 1801 may additionally include a processor that is configured as a part of the AP 1810, or separately configured to control the sensor module 1840, so the electronic device 1801 controls the sensor module 1840 while the AP 1810 is in the sleep state.

The input device 1850 includes a touch panel 1852, a (digital) pen sensor 1854, a key 1856, and an ultrasonic input device 1858.

The touch panel 1852 may use at least one of a capacitive scheme, a resistive scheme, an infrared scheme, and an ultrasonic scheme. The touch panel 1852 may further control a control circuit. The touch panel 1852 may further include a tactile layer to provide a tactile response (or tactile feedback) to the user.

The (digital) pen sensor 1854 may be a part of the touch panel 1852, or may include a separate sheet for recognition.

The key 1856 may include a physical button, an optical key, or a keypad.

The ultrasonic input device 1858 identifies data by detecting a sound wave with a microphone 1888 in the electronic device 1801 using an input tool that generates an ultrasonic signal.

The display 1860 includes a panel 1862, a hologram device 1864, and a projector 1866.

The panel 1862 may have the configuration that is same as or similar to that of the display 1360 in FIG. 13. The panel 1862 may be implemented to be flexible, transparent or wearable. The panel 1862, together with the touch panel 1852, may be configured as one module.

The hologram device 1864 shows stereoscopic images in the air using an interference of light.

The projector 1866 displays an image by projecting light on a screen. The screen may be located in the inside or outside of the electronic device 1801.

The display 1860 may further include a control circuit for controlling the panel 1862, the hologram device 1864 or the projector 1866.

The interface 1870 includes an HDMI 1872, a USB 1874, an optical interface 1876, or a D-subminiature (D-sub) 1878.

The interface 1870 may be incorporated into, for example, the communication interface 1370 illustrated in FIG. 13. Additionally or alternatively, the interface 1870 may include a Mobile High-Definition Link (MHL) interface, a Secure Digital (SD) card/Multi-Media Card (MMC) interface, or an Infrared Data Association (IrDA) interface.

The audio module 1880 converts a sound into an electrical signal, and vice versa. Some components of the audio module 1880 may be incorporated into, for example, the I/O interface 1350 illustrated in FIG. 13. The audio module 1880 processes the sound information that is input or output through, for example, a speaker 1882, a receiver 1884, an earphone 1886 or the microphone 1888.

The camera module 1891, which is a device capable of shooting still images and video, may include one or more image sensors (e.g., a front image sensor or a rear image sensor), a lens, an Image Signal Processor (ISP), and a flash (e.g., LED or xenon lamp).

The power management module 1895 manages the power of the electronic device 1801. The power management module 1895 may include a Power Management Integrated Circuit (PMIC), a charger Integrated Circuit (IC), or a battery gauge.

The PMIC may have a wired and/or wireless charging scheme. The wireless charging scheme may include a magnetic resonance scheme, a magnetic induction scheme, or an electromagnetic wave scheme, and may further include additional circuits (e.g., a coil loop, a resonance circuit, or a rectifier) for wireless charging.

The battery gauge measures the remaining capacity, the charging voltage and current, or the temperature of the battery 1896.

The battery 1896 includes, for example, a rechargeable battery and/or a solar battery. The battery 1896 may be implemented to include a resonator for receiving wireless power supplied from the charging device 301.

The indicator 1897 indicates a particular status (e.g., a booting status, a message status or charging status) of a part (e.g., the AP 1810) of the electronic device 1801.

The motor 1898 converts an electrical signal into mechanical vibrations, and generates vibration or haptic effects.

The electronic device 1801 may include a processing unit (e.g., CPU) for supporting mobile TV. The processing unit for supporting mobile TV may process media data that is based on, for example, the Digital Multimedia Broadcasting (DMB), Digital Video Broadcasting (DVB), or a media flow standard.

Each of the components of the electronic device 1801 may include one or more parts, and the name of the component may vary depending on the type of the electronic device 1801. In various embodiments, the electronic device 1801 may include at least one of the above-described components, some of which can be omitted, or may further include other additional components. In addition, some of the components of the electronic device 1801 may be configured as one entity by being combined, making it possible to equally perform the function of the components, which was performed before the combination.

Figure 19:
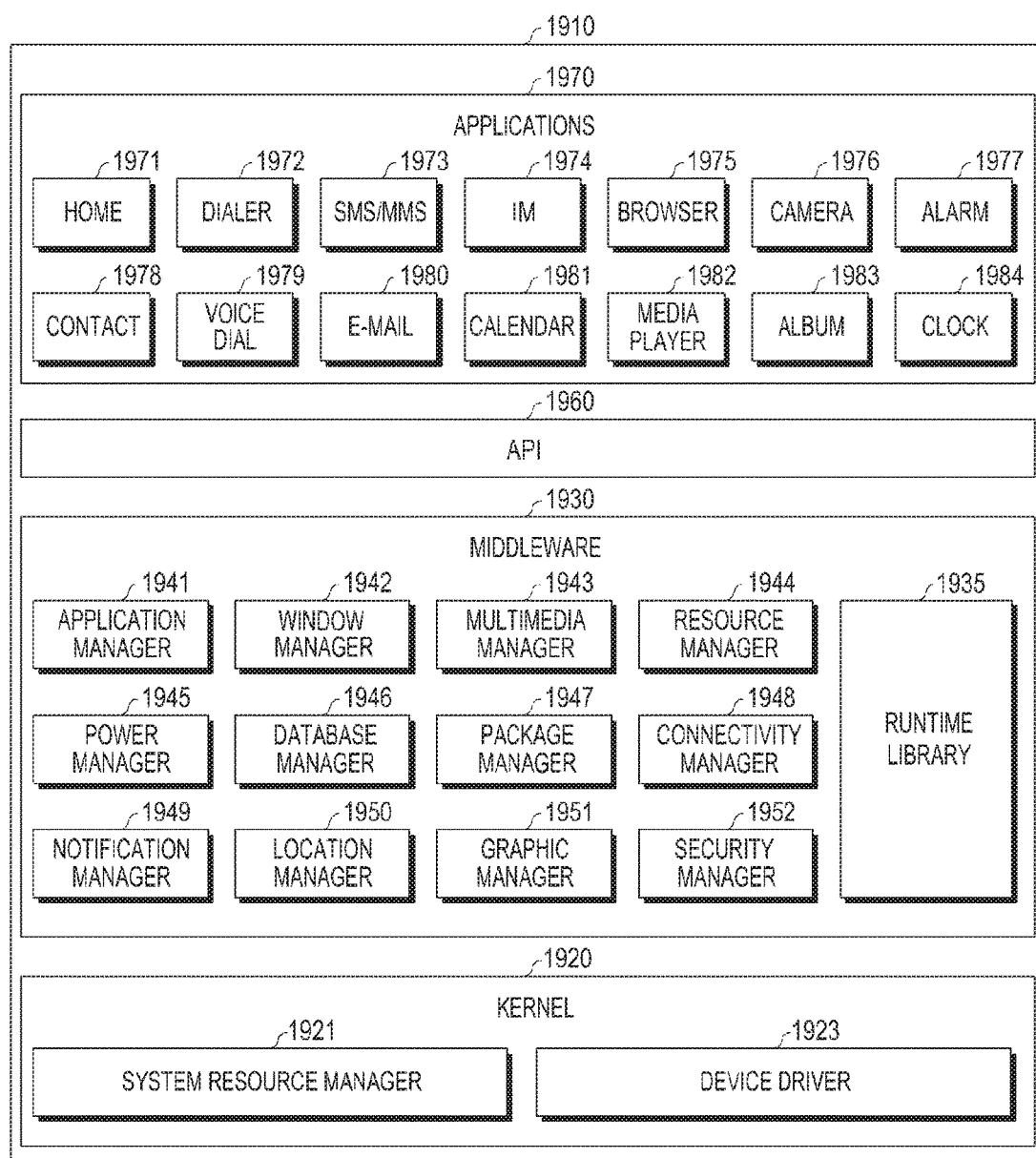
FIG. 19 is a block diagram of a program module of an electronic device, according to an embodiment of the present invention.

FIG. 19 is a block diagram of a program module of an electronic device, according to an embodiment of the present invention.

Referring to FIG. 19, the program module 1910 (e.g., the program 1340 of FIG. 13) includes an Operating System (OS) for controlling the resources related to the electronic device 801 and/or various applications (e.g., the application 1347 of FIG. 13) that are driven in the operating system. The OS may be, for example, Android™, iOS™, Windows™, Symbian™, Tizen™, Bada™, etc.

The program module 1910 includes a kernel 1920, a middleware 1930, an API 1960, and applications 1970. At least a portion of the program module 1910 may be pre-loaded on the electronic device 801, or may be downloaded from a server (e.g., the server 1306 of FIG. 13).

The kernel 1920 (e.g., the kernel 1341 in FIG. 13) includes a system resource manager 2021 and a device driver 2023.

The system resource manager 2021 performs an operation of controlling, allocating, or withdrawing system resources. The system resource manager 1921 includes a process manager, a memory manager, or a file system manager.

The device driver 1923 may include, for example, a display driver, a camera driver, a Bluetooth driver, a shared memory driver, a USB driver, a keypad driver, a WIFI driver, an audio driver, or an Inter-Process Communication (IPC) driver.

The middleware 1930 may provide a function that is commonly required by the applications 1970, or provides various functions to the applications 1970 through the AP 1960 so that the applications 1970 may efficiently use the limited system resources in the electronic device 801. The middleware 1930 (e.g., the middleware 1743) may include at least one of a runtime library 1935, an application manager 1941, a window manager 1942, a multimedia manager 1943, a resource manager 1944, a power manager 1945, a database manager 1946, a package manager 1947, a connectivity manager 1948, a notification manager 1949, a location manager 1950, a graphic manager 1951, and a security manager 1952.

The runtime library 1935 includes a library module that a compiler uses to add a new function through a programming language while the applications 1970 are executed. The runtime library 1935 performs functions for I/O management, memory management or arithmetic function.

The application manager 1941 manages the life cycle of at least one of the applications 1970.

The window manager 1942 manages Graphic User Interface (GUI) resources that are used in the screen.

The multimedia manager 1943 determines the format required for playback of various media files, and performs encoding or decoding on the media files using a codec suitable for the format.

The resource manager 1944 manages resources such as source code, memory or storage space for at least one of the applications 1970.

The power manager 1945 manages the battery or power by operating with, for example, the Basic Input/Output System (BIOS), and provides power information required for an operation of the electronic device 801.

The database manager 1946 creates, searches, or changes a database to be used in at least one of the applications 1970.

The package manager 1947 manages installation or update of applications that are distributed in the form of a package file.

The connectivity manager 1948 manages wireless connections such as, for example, WIFI or Bluetooth.

The notification manager 1949 informs or notifies the user of an event such as a message arrival, an appointment, and a proximity alert, in a manner that doesn't interfere with the user.

The location manager 1950 manages location information of the electronic device 801.

The graphic manager 1951 manages the graphic effect to be provided to the user, or an associated user interface.

The security manager 1952 provides various security functions required for system security or user authentication.

If the electronic device 801 includes a phone function, the middleware 1930 may further include a telephony manager for managing the voice or video call function of the electronic device 801.

The middleware 1930 may alternatively or additionally include a middleware module that forms a combination of various functions of the above-described components. The middleware 1930 may provide a module specialized for the type of the operating system, in order to provide a differentiated function. In addition, the middleware 1930 may dynamically delete some of the existing components, or add new components.

The API 1960 (e.g., the API 1745), which is a set of API programming functions, may be provided, for example, in a different configuration depending on the operating system. For example, Android™ or iOS™ may provide one API set per platform, and Tizen™ may provide two or more API sets per platform.

The applications 1970 includes one or more applications capable of providing functions, such as home 1971, dialer 1972, SMS/MMS 1973, Instant Message (IM) 1974, browser 1975, camera 1976, alarm 1977, contact 1978, voice dial 1979, e-mail 1980, calendar 1981, media player 1982, album 1983, clock 1984, health care (e.g., measurement of blood sugar or exercise), or environmental information (e.g., provision of pressure, humidity or temperature information).

The applications 1970 may include an application (e.g., an information exchange application) for supporting information exchange between the electronic device 801 and external electronic device 1304.

The information exchange application includes, for example, a notification relay application for relaying specific information to the external electronic devices, or a device management application for managing the external electronic devices.

For example, the notification relay application includes a function of relaying the notification information generated in other applications (e.g., an SMS/MMS application, an e-mail application, a health care application, or an environmental information application) of the electronic device 801, to the external electronic device 1304. In addition, the notification relay application may receive notification information from the external electronic device 1304 and provide the received notification information to the user.

The device management application may manages at least one function (e.g., a function of turning on/off the external electronic device itself (or some components thereof) or adjusting the brightness (or resolution) of the display) of the external electronic device 1304 that communicates with the electronic device 801, and/or manages (e.g., install, delete or update) an application operating in the external electronic device 1304 or a service (e.g., a call service or a messenger service) provided in the external electronic device 1304.

The applications 1970 may include an application (e.g., a health care application) that is specified depending on the attributes (i.e., attributes indicating that the type of the electronic device is a mobile medical device) of the external electronic device 1304. The applications 1970 may include an application that is received from the external electronic device 1304 or the server 1306. The application 1970 may include a preloaded application, or a third party application that can be downloaded from the server 1306. The names of the components of the illustrated program module 1910 may vary depending on the type of the OS.

According to various embodiments of the present invention, at least a portion of the program module 1910 may be implemented by software, firmware, hardware or a combination thereof. At least a portion of the program module 1910 may be implemented by, for example, a processor (e.g., the AP 1810). At least a portion of the program module 1910 may include, for example, a module, a program, a routine, a set of instructions, or a process for performing one or more functions.

As used herein, the term 'module' may refer to a unit that includes a combination of, for example, hardware, software or firmware. The term 'module' may be interchangeably used with, for example, terms such as unit, logic, logical block, component or circuit. The module may be the minimum unit of a component that is configured as a single body, or a part thereof. The module may be the minimum unit that performs one or more functions, or a part thereof. The module may be implemented mechanically or electronically. For example, the module may include at least one of an Application-Specific Integrated Circuit (ASIC) chip, a Field-Programmable Gate Arrays (FPGAs) chip, or a programmable-logic device, which have been known, or will be developed in the future, and which may perform any operation.

The device (modules or their functions) or method (operations), according to various embodiments of the present invention, may be implemented by a command that is stored in a computer-readable storage media in the form of a program module. If the command is executed by the processor 1320, the processor performs a function corresponding to the command. The computer-readable storage media may be, for example, the memory 1330.

The computer-readable storage media includes a hard disk, a floppy disk, magnetic media (e.g., magnetic tape), optical media (e.g., Compact Disc Read Only Memory (CD-ROM), Digital Versatile Disc (DVD), or magneto-optical media (e.g., floptical disk)), or a hardware device (e.g., Read Only Memory (ROM), Random Access Memory (RAM) or flash memory). In addition, the program command may include not only the machine code made by the compiler, but also high-level language code that can be executed by the computer using an interpreter and the like. The hardware device may be configured to operate as one or more software modules to perform the operations according to various embodiments of the present invention, and vice versa.

The module or program module, according to various embodiments of the present invention, may include at least one of the above-described components, some of which can be omitted, or may further include other additional components. The operations performed by the module, the program module, or other components, according to various embodiments of the present invention, may be performed in a sequential, parallel, iterative, or heuristic manner. In addition, some operations may be performed in a different order, omitted, or other operations may be added.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. An electronic device for receiving a wireless power, the electronic device comprising:
   a display configured to display a date, a day, a current time or a current weather in a clock mode; and
   a processor configured to:
   if the electronic device starts to receive a wireless power from a charging device, switch an operation mode of the electronic device to the clock mode,
   if a reception of the wireless power from the charging device is terminated, determine whether charging of the electronic device is completed, and
   if the charging of the electronic device is completed, maintain the clock mode.

2. The electronic device of claim 1, wherein the processor is further configured to:
   if the charging of the electronic device is not completed, stop the clock mode.

3. The electronic device of claim 1, wherein the clock mode is an operation mode for continuously displaying the date, the day, the current time, or the current weather.

4. The electronic device of the claim 1, wherein, if the electronic device is arranged to face to the charging device in a face-to-face manner, the reception of the wireless power is started.

5. The electronic device of claim 1, wherein the charging device includes a first part protruding upward from a surface of the charging device at an angle greater than or equal to a predetermined angle with respect to the surface of the charging device,
   wherein, if the electronic device is inserted into a groove of the charging device and arranged to face to the first part in a face-to-face manner, the reception of the wireless power is started.

6. A method for receiving a wireless power at an electronic device, the method comprising:
   if the electronic device starts to receive a wireless power from a charging device, switching an operation mode of the electronic device to a clock mode;
   if a reception of the wireless power from the charging device is terminated, determining whether charging of the electronic device is completed; and
   if the charging of the electronic device is completed, maintaining the clock mode.

7. The method of claim 6, further comprising:
   if the charging of the electronic device is not completed, stopping the clock mode.

8. The method of claim 6, wherein the clock mode is an operation mode for continuously displaying a date, a day, a current time, or a current weather.

9. The method of claim 6, wherein, if the electronic device is arranged to face to the charging device in a face-to-face manner, the reception of the wireless power is started.

10. The method of claim 6, wherein the charging device includes a first part protruding upward from a surface of the charging device at an angle greater than or equal to a predetermined angle with respect to the surface of the charging device,
    wherein, if the electronic device is inserted into a groove of the charging device and arranged to face to the first part in a face-to-face manner, the reception of the wireless power is started.

11. An electronic device for receiving a wireless power, the electronic device comprising:
    a communication interface;
    a display configured to display a date, a day, a current time or a current weather in a clock mode; and
    a processor configured to:
    if the electronic device starts to receive a wireless power from a charging device, switch an operation mode of the electronic device to the clock mode, and
    during receiving the wireless power from the charging device, control the communication interface to transmit, to another electronic device connected with the electronic device, a request for performing a function that is requested from the electronic device such that the function is performed in the another electronic device.

12. The electronic device of claim 11, wherein the communication interface further configured to receive a performance result of the function from the another electronic device.

13. The electronic device of claim 12, wherein the processor is further configured to:
    control the display to display the performance result of the function.

14. A method for receiving a wireless power, the method comprising:
    displaying a date, a day, a current time or a current weather in a clock mode;
    if the electronic device starts to receive a wireless power from a charging device, switching an operation mode of the electronic device to the clock mode; and
    during receiving the wireless power from the charging device, transmitting, to another electronic device connected with the electronic device, a request for performing a function that is requested from the electronic device such that the function is performed in the another electronic device.

15. The method of claim 14, further comprising:
    receiving a performance result of the function from the another electronic device.

16. The method of claim 15, further comprising:
    displaying the performance result of the function.

* * * * *